US011867494B2

(12) United States Patent
Matsumoto et al.

(10) Patent No.: US 11,867,494 B2
(45) Date of Patent: Jan. 9, 2024

(54) OPTICAL DISPLACEMENT SENSOR

(71) Applicant: Keyence Corporation, Osaka (JP)

(72) Inventors: Daiki Matsumoto, Osaka (JP);
Choryon Oh, Osaka (JP)

(73) Assignee: KEYENCE CORPORATION, Osaka (JP)

(*) Notice: Subject to any disclaimer, the term of this patent is extended or adjusted under 35 U.S.C. 154(b) by 195 days.

(21) Appl. No.: 17/195,690

(22) Filed: Mar. 9, 2021

(65) Prior Publication Data
US 2021/0318115 A1    Oct. 14, 2021

(30) Foreign Application Priority Data
Apr. 10, 2020 (JP) ................................. 2020-071365

(51) Int. Cl.
G01B 11/02 (2006.01)
G01B 11/14 (2006.01)
G01S 7/481 (2006.01)
G01S 7/51 (2006.01)
G01S 17/08 (2006.01)

(52) U.S. Cl.
CPC ............ G01B 11/026 (2013.01); G01B 11/14 (2013.01); G01S 7/4813 (2013.01); G01S 7/51 (2013.01); G01S 17/08 (2013.01)

(58) Field of Classification Search
CPC ....... G01B 11/026; G01B 11/14; G01S 7/481; G01S 7/4813; G01S 7/51; G01S 17/08; G01S 17/48
See application file for complete search history.

(56) References Cited

U.S. PATENT DOCUMENTS

| 4,282,430 A | * | 8/1981 | Hatten | G01S 17/04 250/221 |
| 4,730,190 A | * | 3/1988 | Win | G01S 7/295 356/627 |
| 5,386,084 A | * | 1/1995 | Risko | H05K 5/068 277/921 |
| 5,433,014 A | * | 7/1995 | Falk | G01D 5/347 455/67.11 |
| 6,642,510 B1 | | 11/2003 | Sugiyama et al. | |

(Continued)

FOREIGN PATENT DOCUMENTS

| CN | 202550435 U | * 11/2012 | ............. H02G 3/083 |
| CN | 102386650 B | * 12/2014 | ............. B60L 3/0069 |

(Continued)

OTHER PUBLICATIONS

U.S. Appl. No. 17/195,689, filed Mar. 9, 2021 (73 pages).

(Continued)

*Primary Examiner* — Gordon J Stock, Jr.
(74) *Attorney, Agent, or Firm* — Kilyk & Bowersox, P.L.L.C.

(57) ABSTRACT

Provided is an optical displacement sensor that allows a housing serving as a head to be downsized. A relay cable extending from the head is integrated with a body. The head is primarily responsible for projecting and receiving light to and from a to-be-detected object, while the body is made up of a power supply circuit, a display, and an operation part. The head includes a green laser light source and emits the green laser light to form a spot on a surface of the to-be-detected object.

18 Claims, 27 Drawing Sheets

(56) References Cited

U.S. PATENT DOCUMENTS

| | | | |
|---|---|---|---|
| 6,646,251 B1 | 11/2003 | Okamoto | |
| 6,774,357 B2 | 8/2004 | Sugiyama et al. | |
| 6,891,625 B2* | 5/2005 | Tomita | G01V 8/12 |
| | | | 356/601 |
| 7,022,979 B2 | 4/2006 | Sugiyama et al. | |
| 7,098,441 B2* | 8/2006 | Yamaguchi | G01V 8/16 |
| | | | 250/221 |
| 7,176,451 B2 | 2/2007 | Sugiyama et al. | |
| 7,244,917 B2 | 7/2007 | Tsukigi et al. | |
| 7,312,854 B2 | 12/2007 | Sugiyama et al. | |
| 7,333,912 B2* | 2/2008 | Iida | G01B 11/14 |
| | | | 702/155 |
| D567,187 S * | 4/2008 | Oba | D13/162 |
| 7,417,217 B2 | 8/2008 | Deguchi et al. | |
| 7,427,748 B2 | 9/2008 | Deguchi et al. | |
| 7,489,410 B2* | 2/2009 | Nishio | G01B 11/24 |
| | | | 356/616 |
| 7,639,373 B2* | 12/2009 | Torii | G01B 11/026 |
| | | | 356/616 |
| 7,639,374 B2 | 12/2009 | Torii et al. | |
| 8,294,905 B2* | 10/2012 | Yamakawa | G01B 11/26 |
| | | | 356/614 |
| 8,675,209 B2* | 3/2014 | Usami | G01S 17/48 |
| | | | 356/614 |
| 8,805,643 B2* | 8/2014 | Takimasa | G01C 3/06 |
| | | | 702/150 |
| 9,488,469 B1* | 11/2016 | Michael | G01B 11/25 |
| 9,593,980 B2* | 3/2017 | Murata | G01J 1/44 |
| 9,668,322 B1* | 5/2017 | Winarski | G01S 17/08 |
| 9,841,808 B2 | 12/2017 | Hanada | |
| 9,933,306 B2* | 4/2018 | Tsukigi | G01N 21/31 |
| 9,983,310 B2* | 5/2018 | Miki | G01S 7/4818 |
| 10,724,849 B2* | 7/2020 | Nishiki | G01C 3/10 |
| 10,724,850 B2* | 7/2020 | Fujiwara | G06T 7/60 |
| D909,900 S * | 2/2021 | Larose | D10/76 |
| 2003/0067613 A1* | 4/2003 | Ishikawa | G06T 7/521 |
| | | | 356/614 |
| 2005/0213112 A1* | 9/2005 | Nakashita | G01B 11/14 |
| | | | 356/625 |
| 2012/0300190 A1* | 11/2012 | Gogolla | G01S 17/08 |
| | | | 356/4.01 |
| 2013/0135604 A1* | 5/2013 | Gogolla | G01C 3/08 |
| | | | 356/4.01 |
| 2013/0271745 A1* | 10/2013 | Ben-Moshe | G01S 17/48 |
| | | | 356/4.01 |
| 2014/0111814 A1* | 4/2014 | Ohmae | G01S 7/493 |
| | | | 356/615 |
| 2014/0204396 A1* | 7/2014 | Giger | H03K 3/57 |
| | | | 372/38.03 |
| 2015/0108376 A1 | 4/2015 | Kawaguchi | |
| 2017/0346996 A1* | 11/2017 | Kida | G03B 43/00 |
| 2019/0242996 A1* | 8/2019 | Pfluger | G01S 17/58 |

FOREIGN PATENT DOCUMENTS

| | | | |
|---|---|---|---|
| CN | 205791430 U | * | 12/2016 |
| CN | 107064949 A | * | 8/2017 |
| CN | 206564451 U | * | 10/2017 |
| JP | H0365604 A | | 3/1991 |
| JP | H06163131 A | | 6/1994 |
| JP | 2006038571 A | * | 2/2006 |
| JP | 2008045926 A | * | 2/2008 |
| JP | 2008145158 A | | 6/2008 |
| JP | 2008145160 A | | 6/2008 |
| JP | 2008304215 A | | 12/2008 |
| JP | 2009156790 A | * | 7/2009 |
| JP | 2010048579 A | | 3/2010 |
| JP | 2013127943 A | | 6/2013 |
| JP | 2013251247 A | | 12/2013 |
| JP | 2015010959 A | | 1/2015 |
| JP | 2015165520 A | * | 9/2015 |
| JP | 2017073322 A | * | 4/2017 |
| JP | 2017073723 A | * | 4/2017 |
| KR | 102045554 B1 | * | 11/2019 |
| WO | WO-2013000139 A1 | * | 1/2013 ........... H02G 3/0658 |

OTHER PUBLICATIONS

Office Action issued in corresponding Japanese Patent Application 2020-071365 dated Oct. 27, 2023 (English translation only)(6 pages).

* cited by examiner (CURRENT VALUE AND THRESHOLD DISPLAY)

(BAR DISPLAY IN DISTANCE MODE)

(BAR DISPLAY IN HEIGHT MODE)

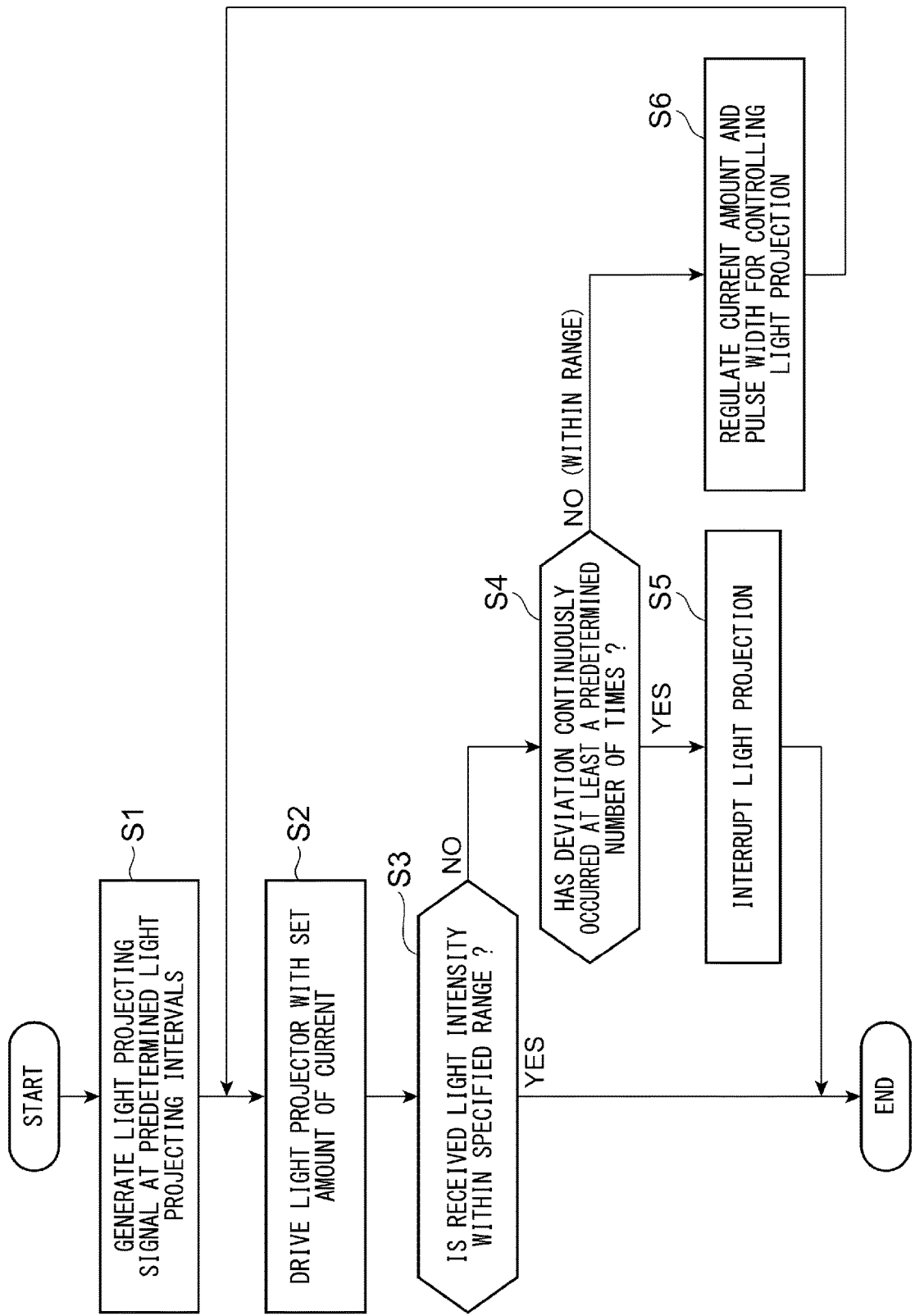

FIG. 14A
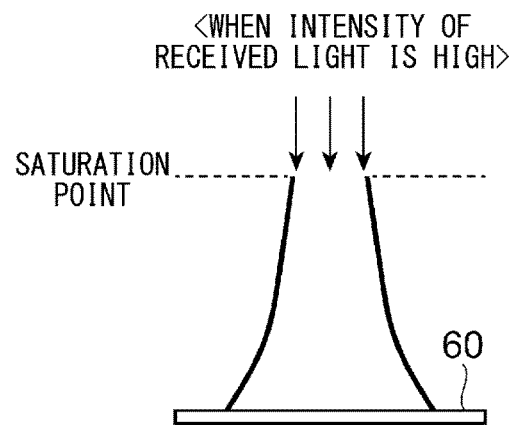
FIG. 14B
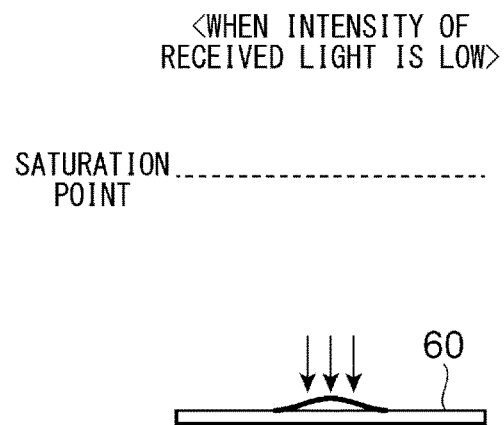
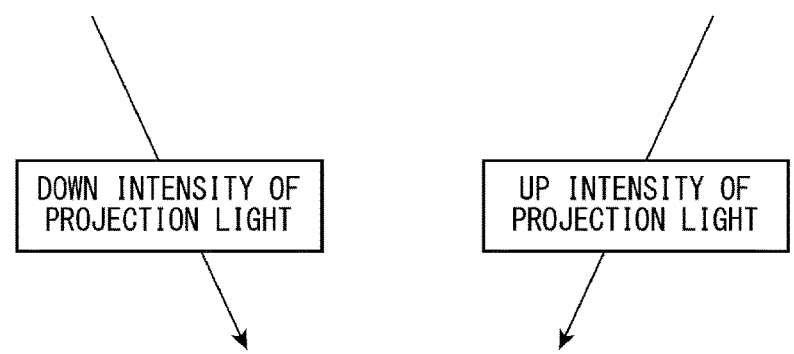
FIG. 14C
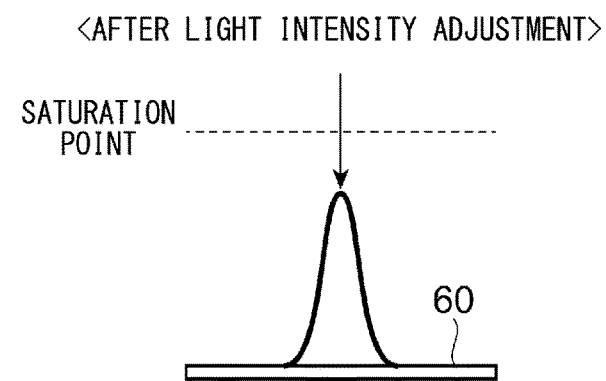

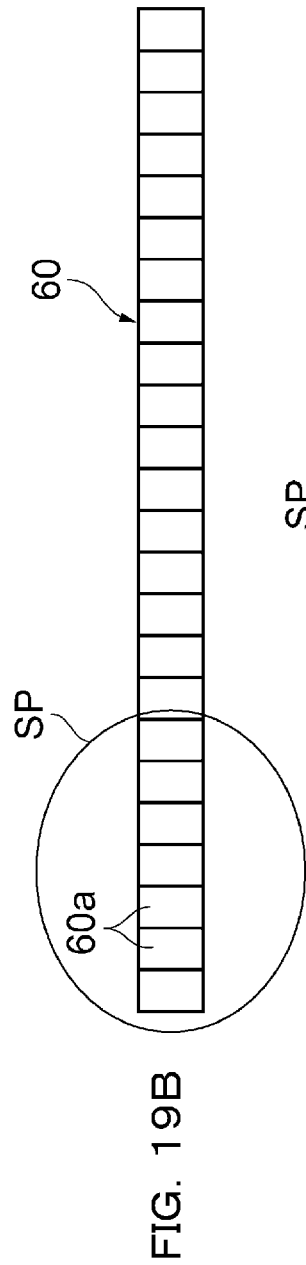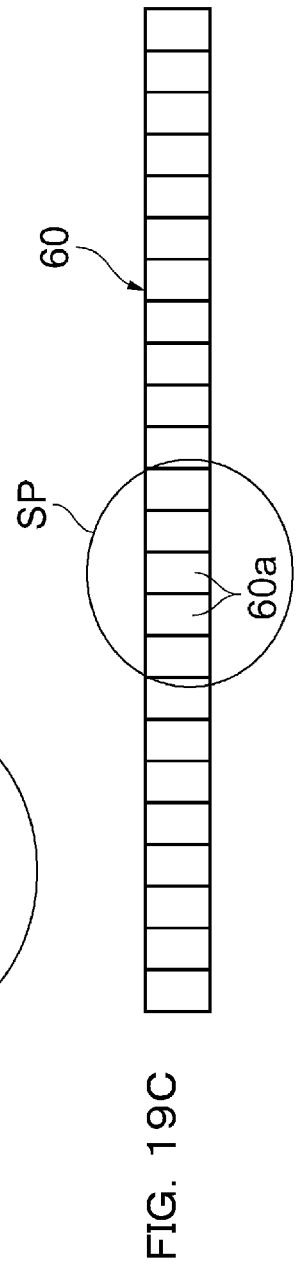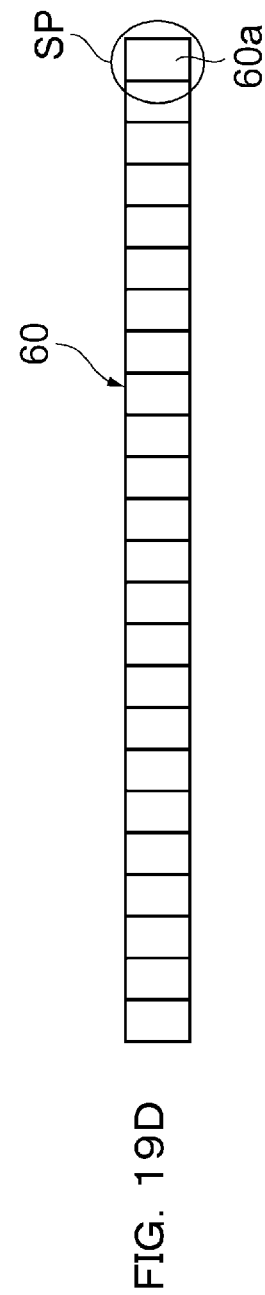

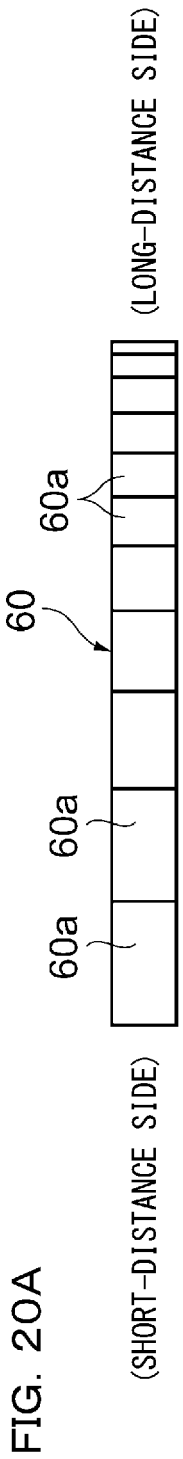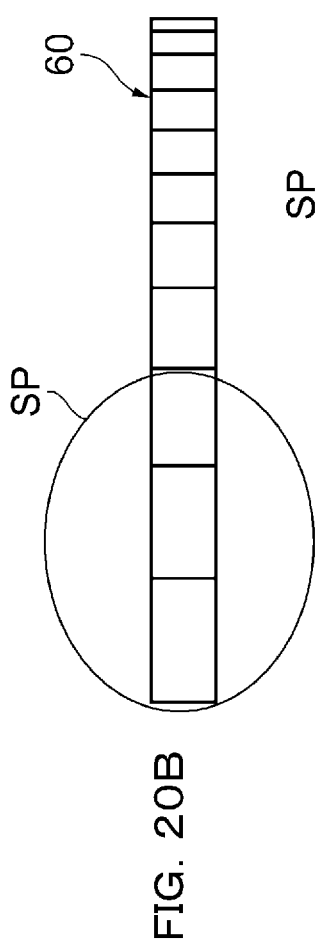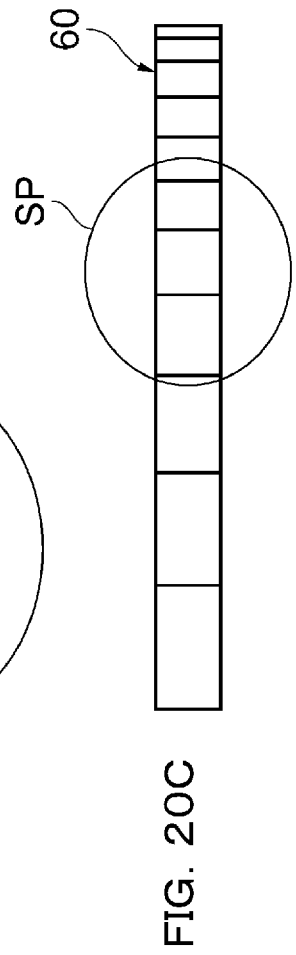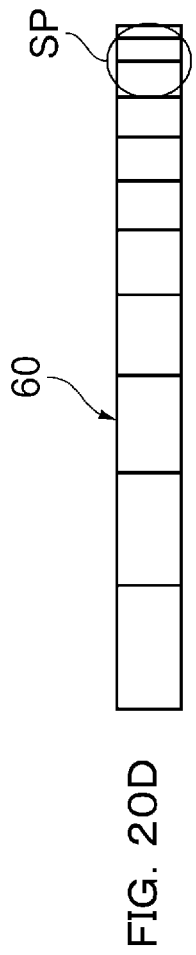

OPTICAL DISPLACEMENT SENSOR

CROSS-REFERENCE TO RELATED APPLICATIONS

The present application claims foreign priority based on Japanese Patent Application No. 2020-071365, filed Apr. 10, 2020, the contents of which are incorporated herein by reference.

BACKGROUND OF THE INVENTION

1. Field of the Invention

The present invention relates to an optical displacement sensor.

2. Description of Related Art

JP 2008-145158 A and JP 2008-145160 A disclose an optical displacement sensor. The optical displacement sensor is used to detect a to-be-detected object in which light is projected onto a detection region, a light receiving element receives reflected light, and then the to-be-detected object is detected on the basis of the output of the light receiving element.

It is known that such a displacement sensor is of either an integrated type or a separated type. In the integrated-type displacement sensor, a display and an operation part are provided in a single housing together with a light projecting and receiving part.

The separated-type displacement sensor includes a head that includes a power supply circuit, and projects and receives light, and a controller (separated amplifier) that controls the head, and the separated amplifier is provided with a display and an operation part and is fixed to a DIN rail.

The integrated-type displacement sensor is large in size because the integrated-type displacement sensor is provided with the display and the operation part, which imposes restrictions on the installation location, for example, when the integrated-type displacement sensor is installed in a narrow space, the display cannot be seen or the operation part cannot be operated.

The separated-type displacement sensor requires an improper wiring protection circuit in order to protect the sensor from a failure in pairing between the head and the separated amplifier, which makes the circuit structure of the head complicated.

SUMMARY OF THE INVENTION

It is therefore an object of the present invention to provide an optical displacement sensor that allows a housing serving as a head to be further downsized.

According to one embodiment of the invention, provided is an optical displacement sensor including a first housing including a transmission window that transmits light, a light projector that is provided in the first housing and projects measurement light toward a detection region through the transmission window, a light receiver that is provided in the first housing and performs photoelectric conversion on the measurement light from the detection region through the transmission window to generate a light receiving signal, a measuring part that is provided in the first housing and measures displacement of a to-be-detected object on the basis of the light receiving signal generated by the light receiver, a cable that transmits power to the first housing, and a second housing that is connected to the first housing by the cable, includes at least a first power supply circuit that supplies power of a first voltage to the first housing through the cable, and is integrated with the cable.

According to one embodiment of the invention, downsizing can be achieved by housing the first power supply circuit used to be included in the first housing in the second housing, and by integrating the cable extending from the first housing with the second housing to eliminate an I/O port of the first housing.

The actions and effects and other objects of the present invention will become apparent from the detailed description of the preferred embodiment given below.

BRIEF DESCRIPTION OF THE DRAWINGS

FIG. 13 is a flowchart for describing control on a limit on intensity and power of green laser light;

FIGS. 14A to 14C are diagrams for describing an explanation when the intensity of received light is too high and an explanation when the intensity of received light is too low;

FIG. 14A shows a case where the intensity of received light is too high;

FIG. 14B shows a case where the intensity of received light is too low;

FIG. 14C shows the intensity of received light after the intensity of projection light is adjusted;

FIGS. 19A to 19D are diagrams for describing an explanation in an imaging element in which pixels are arranged at equal intervals;

FIGS. 20A to 20D are diagrams for describing settings of a pixel width in an imaging element in which pixels are arranged at unequal intervals;

DETAILED DESCRIPTION OF PREFERRED EMBODIMENTS

Embodiments

First Embodiment (FIGS. 1 to 26)

Figure 1:
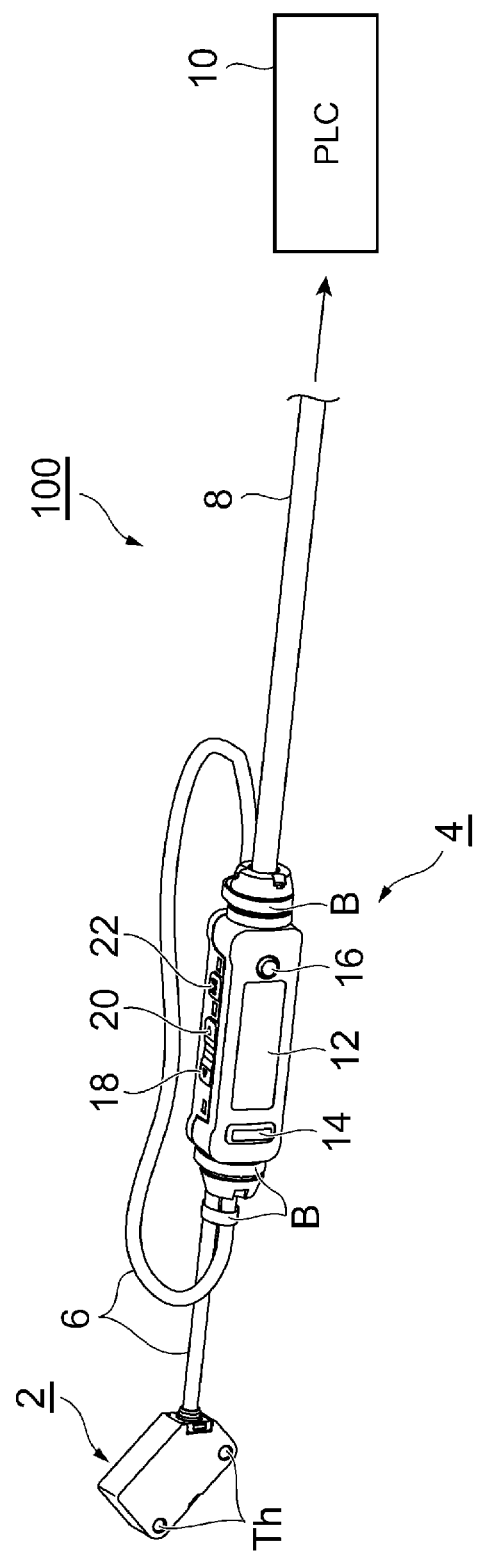
FIG. 1 is a diagram for describing an overall structure of an optical triangulation sensor according to a first embodiment.

FIG. 1 shows a displacement sensor according to a first embodiment. Specifically, the displacement sensor according to the first embodiment is an optical triangulation sensor 100. The triangulation sensor 100 is made up of a head 2 serving as a first housing and a body 4 serving as a second housing, and a relay cable 6 extending from the head 2 is integrated with the body 4. The head 2 is primarily responsible for projecting and receiving light to and from a to-be-detected object, while the body 4 is made up of a power supply circuit, a display, and an operation part. The head 2 includes a green laser light source and emits the green laser light to form a spot on a surface of the to-be-detected object.

In the triangulation sensor 100 according to the first embodiment, the head 2 having no display function is responsible only for projecting and receiving light to and from the to-be-detected object, thereby allowing the head 2 to be downsized. This in turn increases a degree of freedom in determining a location where the head 2 is installed. Further, the body 4 integrated with the head 2 by the relay cable 6 also has a degree of freedom in determining an installation location of the body 4. Thus, placing the head 2 at a position suitable for the measurement of the to-be-detected object and placing the body 4 at any desired position near the head 2 allows setting work such as a setting of a determination threshold to be performed while visually recognizing the spot of the green laser light appearing on the surface of the to-be-detected object to determine whether the position of the spot is appropriate and viewing a display of the body 4.

Power is supplied from the body 4 to the head 2, and signals are exchanged between the body 4 and the head 2. The relay cable 6 may be connected to the head 2 and/or the body 4 with a connector interposed between the relay cable 6 and the head 2 and/or the body 4, but a connection without a connector eliminates the need for an I/O port. When a connector is interposed, a separation distance between the head 2 and the body part 4 can be freely set by preparing a plurality of relay cables 6 having different lengths, but a connection part including the I/O port is required. A connection without a connector not only allows connection parts of the head and the body 4 for the relay cables 6 to be downsized, but also eliminates the need for measures such as a protection circuit for improper wiring between a pair of the head and the body 4. Further, this prevents a mismatch problem of accidentally connecting to a different model.

Among components included in a typical triangulation sensor, a group of components such as an optical component necessary for triangulation, and an element and power supply board for such an optical component are housed in the head 2, and the other group of components such as a dot matrix display such as an organic EL display (OELD: Organic Electro-Luminescent Display), and an operation button are provided in the body 4. This allows the head 2 to be downsized.

Figure 2:
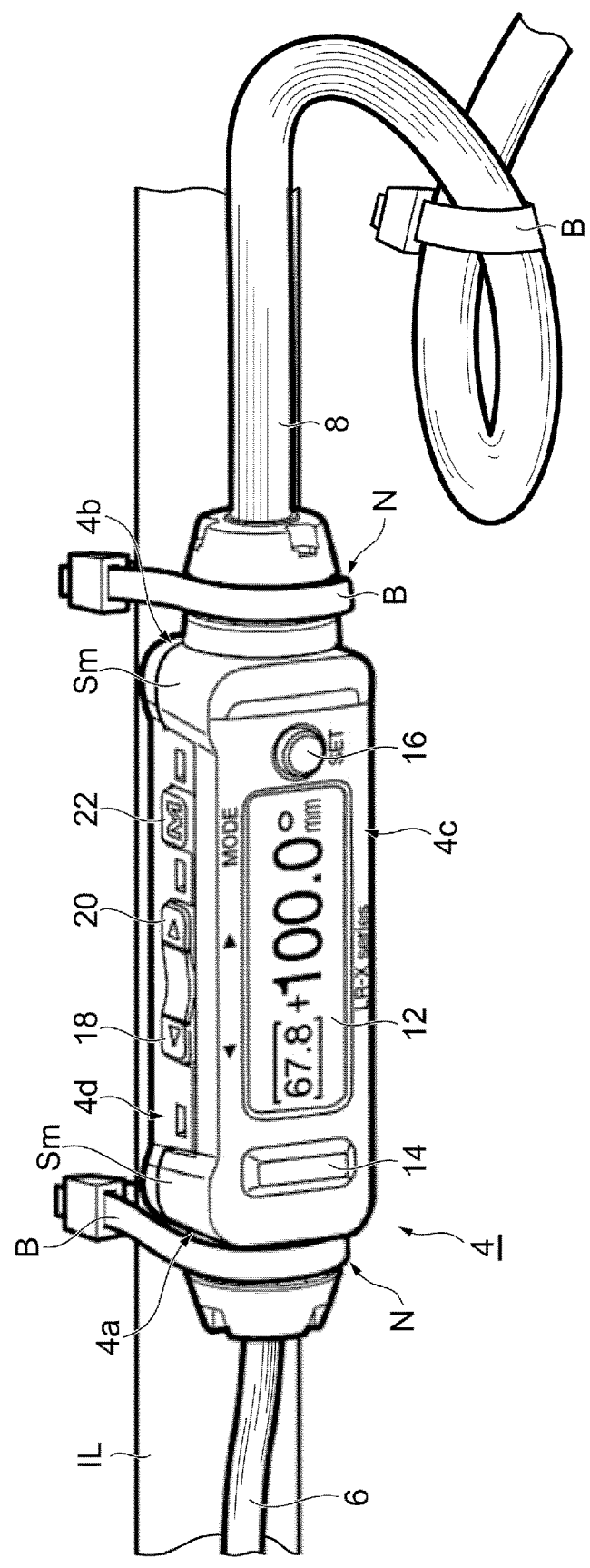
FIG. 2 is a diagram for describing that a body serving as a part of the optical triangulation sensor according to the first embodiment can be fixed at a desired location, showing an example where the body is fixed at the desired location with a zip tie.

FIG. 2 shows the body 4. The body 4 has a long and narrow outer shape with a somewhat flat and approximate rectangular cross section, and includes a head side end 4a located at one end in its longitudinal direction and an output side end 4b located at the other end in the longitudinal direction. Further, four side surfaces of the body 4 include a first side surface 4c that is relatively wide and a second side surface 4d that is narrow and adjacent to the first side surface 4c. The body 4 has a waterproof structure including a connection part of the relay cable 6 and a connection part of an output cable 8. The relay cable 6 and the output cable 8 may be cables each having a metal jacket or cables each having no metal jacket. It is preferable that the relay cable 6 and the output cable 8 be formed into cables each having a metal jacket to increase robustness.

Figure 3:
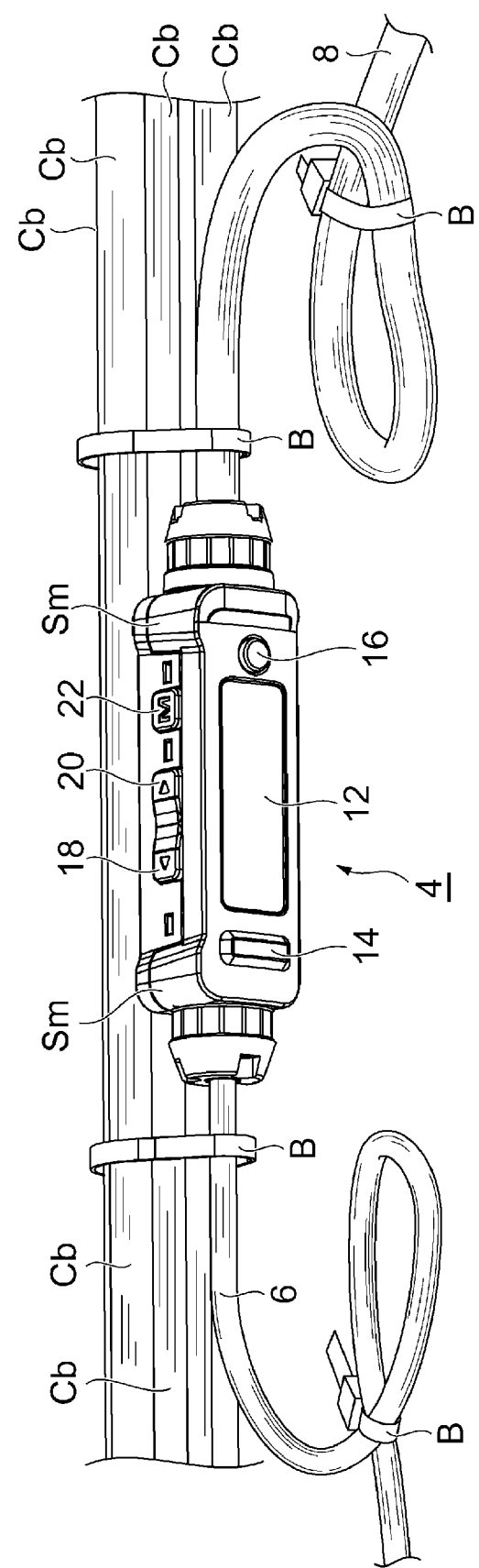
FIG. 3 is a diagram showing an example where the body is fixed to a bundle of cables with the zip tie.

The output cable 8 is connected to the body 4, and a determination signal, that is, an ON/OFF signal, is output from the body 4 through the output cable 8 to an external environment device 10 (FIG. 1) such as a PLC (Programmable Logic Controller), a controller of a separated sensor, or a control device. Both the relay cable 6 and the output cable 8 have flexibility that allows the relay cable 6 and the output cable 8 to be bent, and a distance between the head 2 and the body 4 can be adjusted as desired by folding and bundling the relay cable 6 and holding the relay cable 6 with a zip tie B as shown in FIG. 1. With reference to FIG. 2, the body 4 has a groove-shaped neck N extending in the longitudinal direction from both the head side end 4*a* and the output side end 4*b*, the groove-shaped neck N having a groove extending in a circumferential direction, and a peripheral surface of the neck N preferably forms a circular shape. Binding the neck N with the zip tie B allows the body 4 to be fixed to a desired installation location IL such as a pipe near the head 2, for example, a location about 30 cm away from the head 2. Further, as shown in FIG. 3, for example, the body 4 can be fixed to a bundle of cables Cb with the zip tie B. In the example shown in FIG. 3, the zip tie B is wound around the relay cable 6 and the output cable 8 to fix the body 4 to the bundle of cables Cb, but the zip tie B may be wound around the neck N.

As a modification to the position where the neck N is disposed, instead of the neck N, a groove for receiving the zip tie B may be provided near the head side end 4*a* and output side end 4*b* of the body 4. The OELD 12 is disposed on the wide first side surface 4*c*. Further, a body operation indicator lamp 14 and a SET button 16 are arranged on one end of the first side surface 4*c* and on the other end of the first side surface 4*c*, respectively, such that the OELD 12 is interposed between the body operation indicator lamp 14 and the SET button 16. The body operation indicator lamp 14 lights up or blinks in synchronization with and in the same color as a front operation indicator lamp 70 and output part operation indicator lamp 76 of the head 2 to be described later.

The body operation indicator lamp 14 includes a green LED (Light Emitting Diode) that coincides with the laser light in that their respective colors are green, and the green is excellent in relative luminosity. The SET button 16 is used to select an operation mode such as automatic threshold setting (teaching mode). An UP button 18 and a DOWN button 20 are arranged adjacent to each other on the narrow second side surface 4*d*, and a mode button 22 is further disposed on the narrow second side surface 4*d*. The UP and DOWN buttons 18, 20 are used, for example, to adjust a threshold or select a menu. The mode button 22 is used to switch the operation modes of the triangulation sensor 100. The SET button 16 described above may be disposed on the narrow second side surface 4*d* rather than the first side surface 4*c*.

The second side surface 4*d* on which the UP button 18, the DOWN button 20, and the mode button 22 are arranged has both ends in the longitudinal direction protected by a raised portion Sm (FIG. 2). That is, the second side surface 4*d* has a basin shape surrounded by two raised portions Sm. The top surfaces of the UP button 18, the DOWN button 20, and the mode button 22 are located lower than the raised portions Sm, so that even when any object comes into collision with the body 4, the raised portions Sm serve as an obstacle to the object to prevent the UP button 18, the DOWN button 20, and the mode button 22 from being accidentally pushed down.

Regarding the body operation indicator lamp 14 described above, either one of the two raised portions Sm may be replaced with an operation indicator lamp. Further, the two raised portions Sm may be omitted, and an operation indicator lamp may be provided at a portion where one of the raised portions Sm is located. As described above, the raised portion Sm has a function of preventing misoperation of accidentally pushing down the UP button 18, the DOWN button 20, or the mode button 22. Instead of the raised portion Sm, a key lock function may be provided to prevent the misoperation of the operation button including the UP button 18, the DOWN button 20, and the mode button 22. This key lock mechanism is not limited to a physical mechanism and may be implemented by software. For example, it is possible to prevent misoperation by, for example, rejecting the operation of the operation button while the sensor 100 is in a predetermined operation.

Figure 4:
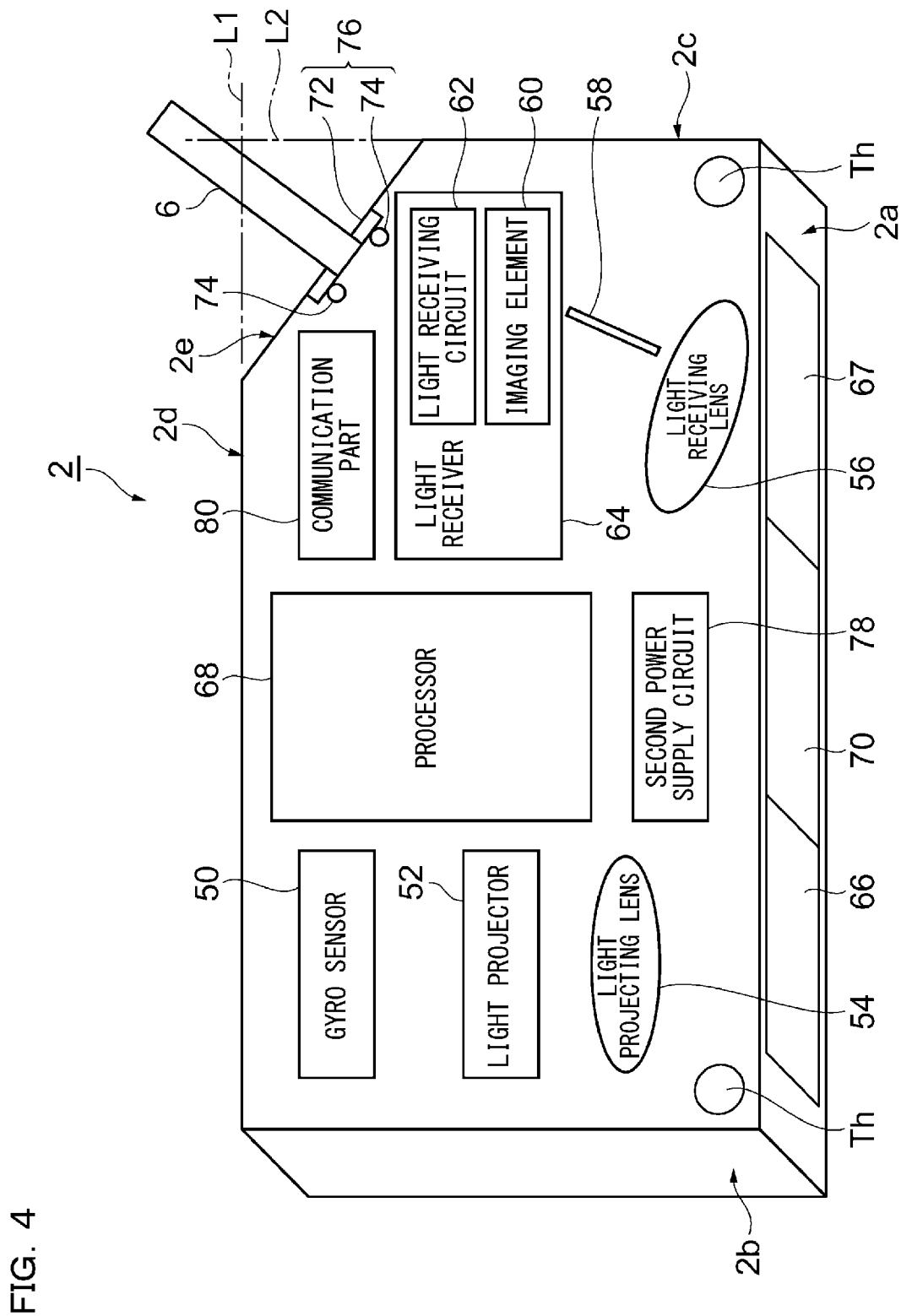
FIG. 4 is a diagram for describing components built in a head serving as a part of the optical triangulation sensor according to the first embodiment.

FIG. 4 is a diagram for describing components arranged inside the head 2. As described above, the head 2 is made up of only an optical component necessary for triangulation, an element for such an optical component, and bare-bones power supply boards that drive the optical component and the element. That is, the head 2 is designed to be downsized to the maximum extent possible. Such downsizing allows an increase in degree of freedom in selecting the installation location of the head 2. Then, since the body 4 integrally connected to the head 2 by the cable 6 can be fixed to a desired location by using the zip tie B, installing the body 4 at a location that is convenient for the user and is relatively close to the head 2 allows the operation of the UP button 18, the DOWN button 20, and the like of the OELD 12 to be performed for setting the determination threshold or the like while viewing the OELD 12 of the body 4.

Measurement light emitted by the head 2 is green laser light to be described later. Compared with red laser light, the green laser light having a shorter wavelength forms a spot image that has a clear outline and is narrowed down to be small, so that the accuracy of the triangulation sensor 100 can be increased. As described above, it is known that green is excellent in relative luminosity. Even when a limit is put on the power of the green laser light so as to satisfy Class 1 and Class 2 of the safety standards for safe use of lasers (e.g. IEC, ANSI), the visibility of the spot of the green laser light can be maintained. As described above, the body 4 can be placed at a desired position near the head 2. As described above, downsizing the head 2 allows an increase in degree of freedom in selecting the installation location. Therefore, placing the head 2 at a position suitable for the measurement of the to-be-detected object and placing the body 4 at any desired position near the head 2 allows setting work such as a setting of a determination threshold to be performed while visually recognizing the spot of the green laser light appearing on the surface of the to-be-detected object to determine whether the position of the spot is appropriate and viewing the OELD 12.

The green laser light source generally requires a high voltage as compared to a red laser light source. A power supply circuit 30A (FIG. 12) for the green laser light source that generates a voltage suitable for the green laser light source is provided in the body 4, and a power supply circuit 78 that generates a voltage suitable for other electronic components (for example, an imaging element 60 and a light receiving circuit 62) is provided in the head 2. The power supply circuit 30A for the green laser light source is removed from the head 2 and is provided in the body 4, thereby allowing the head 2 to be downsized. Further, in order to further increase the degree of freedom in installing the head 2, a housing structure that can be installed using a side surface, back surface 2*d*, or the like of the head 2 is employed where the head 2 is downsized, and surfaces other than a light projecting and receiving surface 2*a* and a corner 2e where the cable 6 is located of the head 2 are made flat. In other words, the degree of freedom in installing the head 2 can be increased by employing a structure where the head 2 has no surface serving as a user interface other than the light projecting and receiving surface 2a and the corner 2e.

The head 2 includes a motion sensor 50 that detects a change in installation position of the head 2. A typical example of the motion sensor 50 is a gyro sensor, and other examples include an acceleration sensor and a geomagnetic sensor. The motion sensor 50 is installed integrally with the head 2. Specifically, the motion sensor 50 is assembled to the head 2 so as not to be displaced relative to the head 2. This allows the motion sensor 50 to sensitively detect optical axis displacement caused by a change in installation position of the head 2 to which an external force is applied, and in turn makes it possible to issue an optical axis displacement occurrence alarm.

The head 2 includes a light projector 52, a light projecting lens 54, a light receiving lens 56, a mirror 58, and an imaging element 60, and these components form an optical path for triangulation. The light projecting lens 54 is made up of a collimator lens. As a modification, the light projecting lens 54 may be made up of a combination of a collimator lens and a cylindrical lens. The use of the combination of the collimator lens and the cylindrical lens has an advantage of allowing an increase in measurement accuracy. The imaging element 60 is made up of a CMOS linear image sensor, and the imaging element 60 includes a charge storage element. A light receiver 64 is made up of the imaging element 60 and a light receiving circuit 62.

The light projector 52 is made up of a semiconductor laser light source (gallium nitride (InGaN/GaN) laser light source) that emits green laser light. The head 2 projects, toward the detection region to be detected, the green laser light. A state of a spot on the surface of the workpiece affects the detection accuracy. The smaller the spot where light is condensed, the higher the detection accuracy. The green laser light is excellent in spot state as compared to red laser light. As is known, green is excellent in relative luminosity. The use of such a characteristic makes it possible to ensure the visibility of the spot even when a limit is put on intensity and power of the green laser light. It is desirable for the user to be able to confirm, with the naked eye, that a desired position on the workpiece is irradiated with the projection light beam in order to properly perform the optical axis adjustment and the threshold setting, and in turn the detection.

The green laser light emitted by the light projector 52 reaches the workpiece through the light projecting lens 54 and a light projecting window 66. The reflected light reflected off the surface of the workpiece passes through a light receiving window 67 and the light receiving lens 56, is refracted by the mirror 58, and is received by the light receiver 64. That is, the light receiver 64 receives the green laser light reflected off the detection region on the workpiece and photoelectrically converts the green laser light into a light receiving signal. The light projector 52 and the light receiver 64 are controlled by a processor 68 built in the head 2.

As can be seen from FIG. 4, the head 2 has an approximate cuboid shape that is relatively thin, and the light projecting window 66 and the light receiving window 67 are arranged on the narrow light projecting and receiving surface 2a, and, between the light projecting window 66 and the light receiving window 67, for example, the front operation indicator lamp 70 made up of a two-color LED including red and green LEDs is disposed. The front operation indicator lamp 70 can light up or blink in red, green, or yellow that is a mixture of red and green.

As can be seen from FIGS. 1 and 4, the head 2 has an approximate cuboid shape, and only the light projecting and receiving surface 2a serves as the user interface. This structure allows the head 2 to be downsized. Then, a structure is employed where the front operation indicator lamp 70 is disposed on the light projecting and receiving surface 2a that exclusively serves as the user interface. Each surface except the light projecting and receiving surface 2a and the inclined corner 2e where the relay cable 6 is located is a flat surface, and the head 2 can be installed by using any surface except the light projecting and receiving surface 2a and the corner 2e. An operation part or a display may be provided on the light projecting and receiving surface 2a serving as the user interface together with the front operation indicator lamp 70 or may be provided on the front operation indicator lamp 70.

Of first and second ends 2b, 2c of the head 2 in the longitudinal direction, a corner 2e between the second end 2c away from the light projecting window 66 and a back surface 2d opposite from the light projecting and receiving surface 2a has a chamfered shape, and the corner 2e is preferably an inclined surface of 45°. A hole through which the relay cable 6 passes is formed at the corner 2e, and a waterproof gasket 72 prevents water from entering the hole. A two-color LED 74 that is the same in color as the front operation indicator lamp 70 is disposed inside the head 2 directly adjacent to the waterproof gasket 72. The waterproof gasket 72 is made of a light guide member that transmits light, and a second operation indicator lamp 76 is made up of the LED 74 and the light guide waterproof gasket 72. The front operation indicator lamp 70 and the output part operation indicator lamp 76 are caused to light up in yellow or green in synchronization with the ON/OFF determination signal or are caused to blink, for example, in red to indicate an error. The lighting color, that is, green, of the front operation indicator lamp 70, the output part operation indicator lamp 76, and the operation indicator lamp 14 of a body 2 is the same as the green of the laser light, and green is excellent in relative luminosity.

Figure 5:
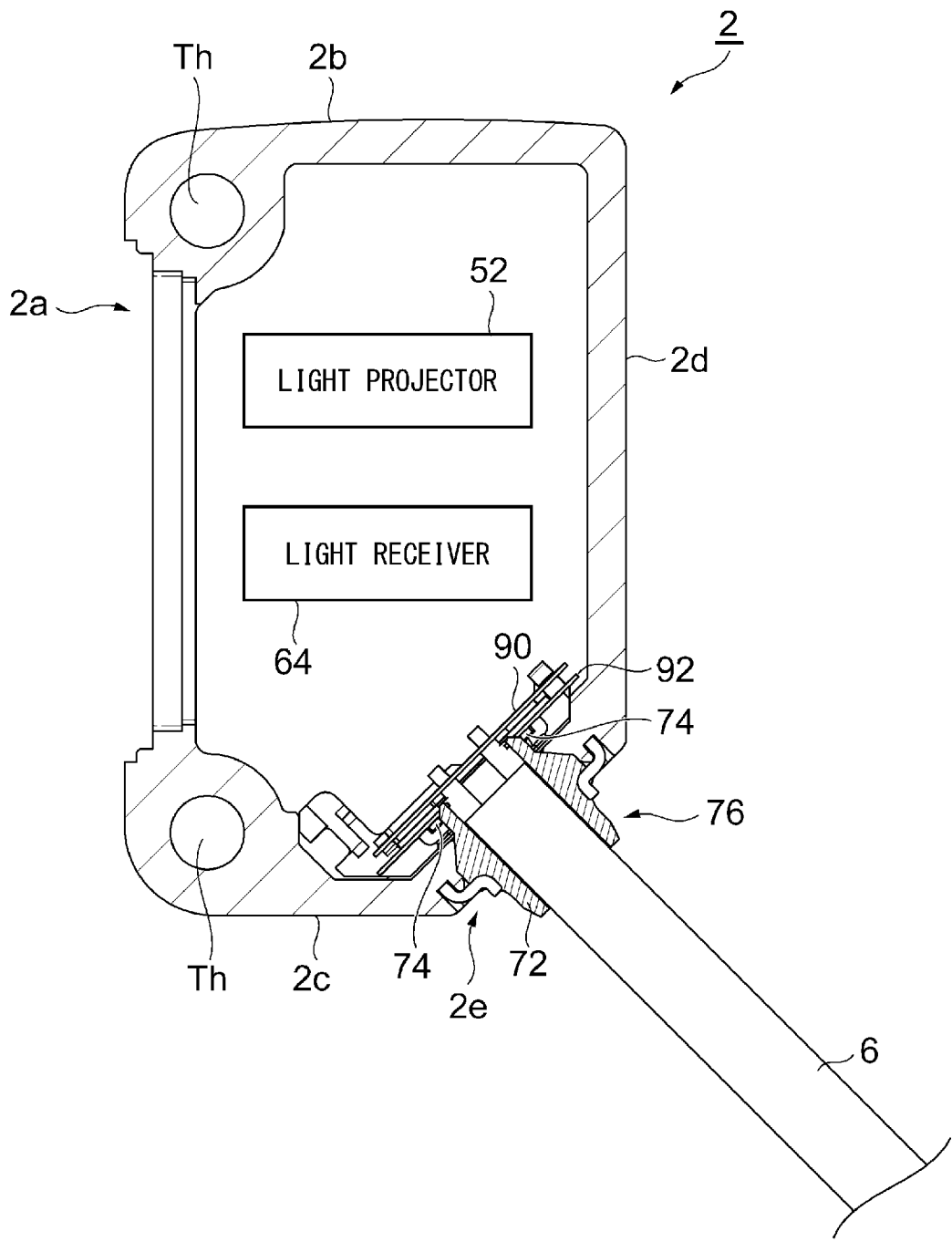
FIG. 5 is a cross-sectional view for describing a structure of an operation indicator lamp installed at an inclined corner of the head.

FIG. 5 is a cross-sectional view of the head 2. An LED board 92 is disposed at the corner 2e, and the red and green LED 74 is mounted on the LED board 92. The light guide material of the waterproof gasket 72 having a water blocking capability for the relay cable 6 is preferably milky white fluororubber, vinyl acetate rubber, or silicone rubber. The light emitted by the red and green LED 74 is diffused by the light guide waterproof gasket 72 and makes the light guide waterproof gasket 72 bright.

During the operation of the triangulation sensor 100, the head 2 is installed in a state where the light projecting and receiving surface 2a and the corner 2e where the relay cable 6 is located are exposed. This prevents the lighting or blinking of not only the front operation indicator lamp 70 located on the light projecting and receiving surface 2a, but also the output part operation indicator lamp 76 located at the corner 2e where the relay cable 6 is located from being blocked.

In the head 2, the relay cable 6 extends from the corner 2e that is an inclined surface. Therefore, for the installation of the head 2, it is possible to install the head 2 by using any one of the five surfaces of the head 2 including the two wide side surfaces, the back surface 2d, and the first and second ends 2b, 2c.

The distance between the head 2 and the body part 4 can be adjusted as desired by folding and bundling the relay cable 6 (FIG. 1), and a location where the body part 4 is installed and fixed is also determined as desired (FIGS. 2 and 3). For the installation of the body 4, a location near the head 2 is selected, and the body 4 is positioned so as to allow the user to easily view the OELD 12. Since the body operation indicator lamp 14 is disposed on the surface where the OELD 12 is disposed, it is easy for the user to visually confirm the body operation indicator lamp 14.

During the operation of the triangulation sensor 100, a total of three operation indicator lamps, the front operation indicator lamp 70 and the output part operation indicator lamp 76 of the head 2, and the operation indicator lamp 14 of the body 4 are placed at locations where the user can easily confirm, without moving, the operation indicator lamps. Accordingly, any one of the front operation indicator lamp 70, the output part operation indicator lamp 76 of the head 2, or the operation indicator lamp 14 of the body 4 allows the user to confirm the operation of the triangulation sensor 100.

As described above with reference to FIG. 2, binding the groove-shaped neck N of the body 4 with the zip tie B allows the body 4 to be fixed to the desired location IL near the head 2. The body 4 has a rectangular cross section. The first side surface on which the OELD 12 is installed and the narrow second side surface on which the UP/DOWN buttons 18, 20, etc. are installed meet at right angles. A third side surface opposite from the first side surface and a fourth side surface opposite from the second side surface are flat surfaces and serve as installation surfaces. With the third side surface and/or the fourth side surface in contact with the installation location, the body 4 can be fixed, with the zip tie B, to the desired location (for example, a pillar) that is relatively flat and near the head 2.

Figure 6A:
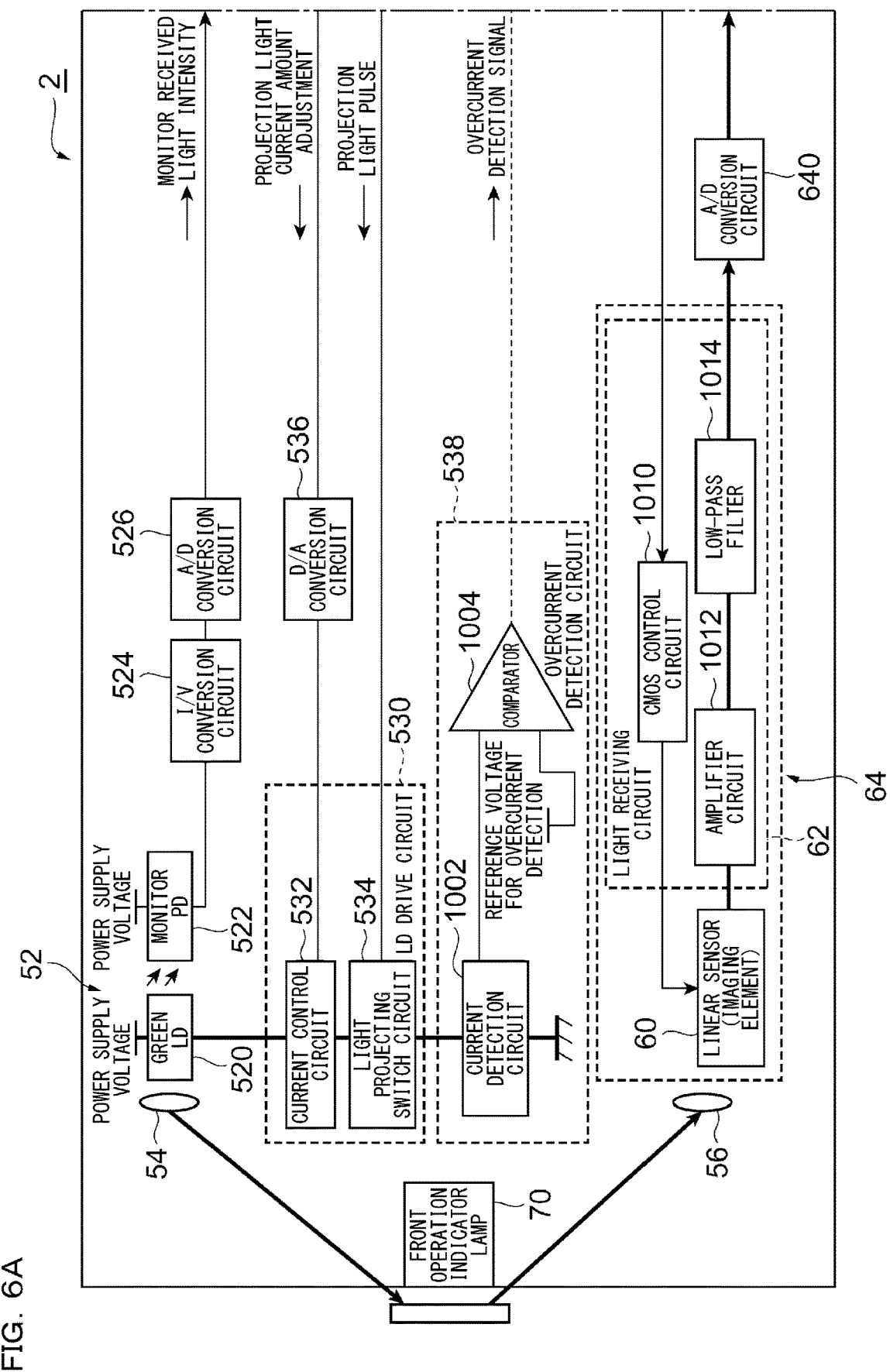
FIG. 6A is a block diagram for describing a control system of the head, showing a part of the head.
Figure 6B:
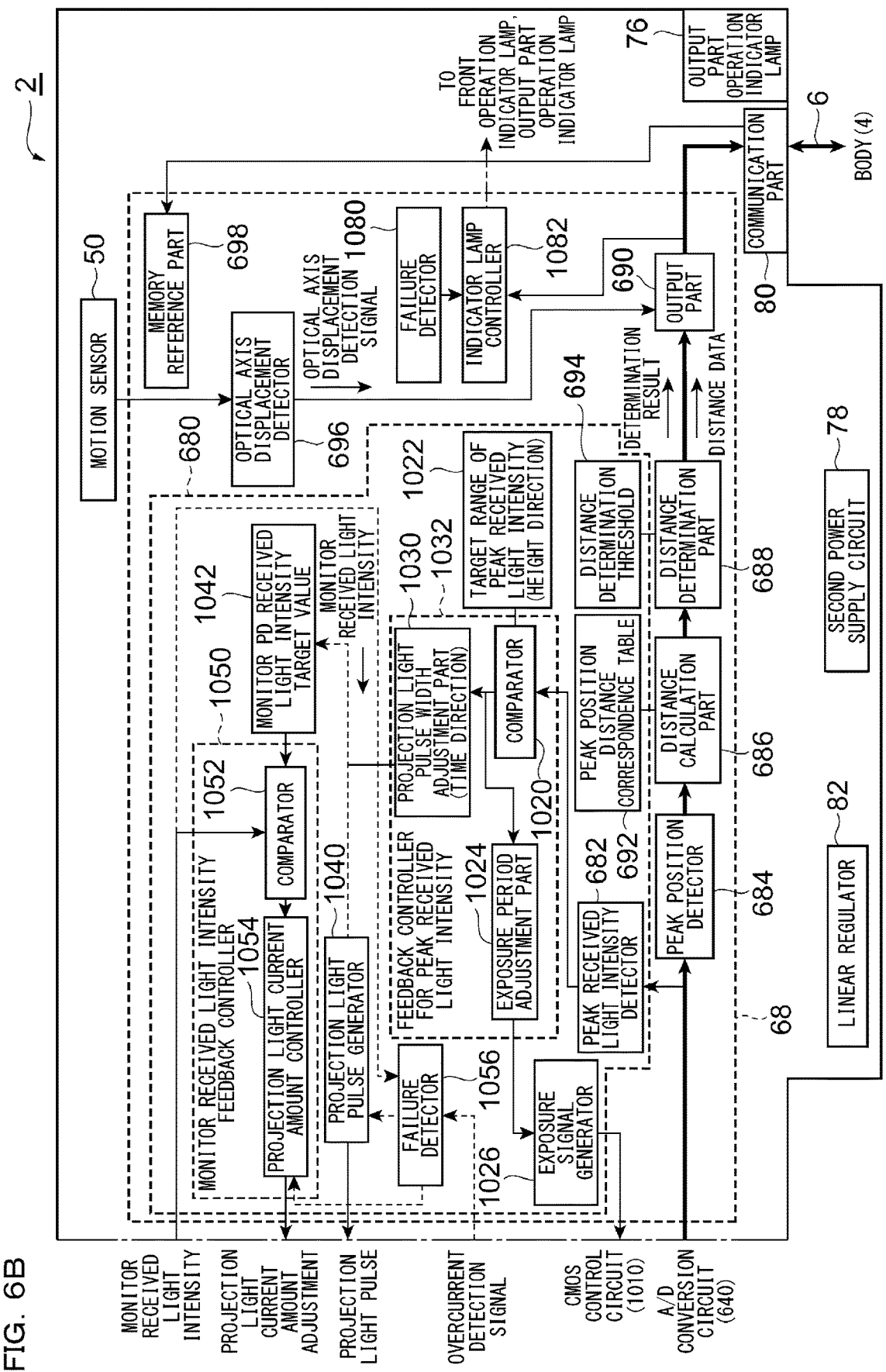
FIG. 6B is a block diagram for describing the control system of the head, showing the other part of the head.

FIGS. 6A and 6B are block diagrams for describing a control system of the head 2. With reference to FIG. 6A, green laser light (having a wavelength of 500 nm to 555 nm, preferably, 500 nm to 532 nm) emitted by a green laser diode (LD) 520 serving as the light projector 52 is monitored by a photodiode (monitor PD) 522, and an output current from the monitor PD 522 is fed back to a light projecting controller 680 via an I/V conversion circuit 524 and an A/D conversion circuit 526 (FIG. 6B). The green LD 520 is controlled by an LD drive circuit 530 (FIG. 6A), and the LD drive circuit 530 is controlled by the light projecting controller 680 (FIG. 6B). With reference to FIG. 6A, the LD drive circuit 530 includes a current control circuit 532 and a light projecting switch circuit 534. A control signal is input from the light projecting controller 680 (FIG. 6B) to the current control circuit 532 (FIG. 6A) via a D/A conversion circuit 536, and a control signal is input from the light projecting controller 680 (FIG. 6B) to the light projecting switch circuit 534. This causes the green LD 520 to project laser light at predetermined intervals and with predetermined intensity.

With reference to FIG. 6A, the current flowing through the LD drive circuit 530 is monitored by an overcurrent detection circuit 538. The overcurrent detection circuit 538 includes a current detection circuit 1002 and a comparator 1004, and when the current flowing through the LD drive circuit 530 is larger than a predetermined value, an overcurrent detection signal is supplied from the comparator 1004 to the light projecting controller 680 (FIG. 6B). Specifically, the comparator 1004 converts the current flowing through the green LD 520 into a voltage and compares the voltage with a reference voltage for overcurrent detection to determine whether the voltage based on the current flowing through the green LD 520 is equal to or less than the reference voltage for overcurrent detection. When an overcurrent is detected, the light projecting controller 680 (FIG. 6B) performs control to interrupt the light projection or suppress the overcurrent.

The position of the image of the projection light spot on the imaging element 60 is identified on the basis of the light receiving signal from the imaging element 60 (FIG. 6A), and the displacement of the workpiece is measured on the basis of the position of the projection light spot thus identified. The light receiving circuit 62 serving as the light receiver 64 (FIG. 6A) includes a CMOS control circuit 1010, an amplifier circuit 1012, and a low-pass filter 1014, and the light receiving signal output from the imaging element 60 is amplified by the amplifier circuit 1012. Information on received light output by the light receiver 64 is input to the processor 68 (FIG. 6B) via an A/D conversion circuit 640. The processor 68 includes a peak received light intensity detector 682, a peak position detector 684, a distance calculation part 686, a distance determination part 688, and an output part 690. The peak received light intensity detector 682 detects a peak value of the received light intensity, and this peak value is input to the light projecting controller 680 to be reflected in the light projecting control. The peak position of the received light intensity is measured by the peak position detector 684 (FIG. 6B) on the basis of the information on the received light generated by the light receiver 64 (FIG. 6A). That is, the peak position detector 684 measures the peak position of the received light intensity on the basis of the information on the received light, and this peak position information is supplied to the distance calculation part 686. The distance calculation part 686 calculates the distance to the workpiece with reference to a table 692 showing a correspondence between the peak position and the distance. The distance to the workpiece calculated by the distance calculation part 686 is supplied to the distance determination part 688, and the distance determination part 688 makes a determination by comparing the distance with a determination threshold 694 stored in a memory. The determination signal that is a binary signal representing ON/OFF is supplied to the body 4 through the output part 690 and a communication part 80. As will be described later, in the body 4, a logic ON/OFF determination signal is generated on the basis of output logic set by the user, and this logic ON/OFF determination signal is output from the body 4 to the outside. As a modification, the determination signal generated by the head 2 may be generated by the body 2. Further, the distance to the workpiece calculated by the distance calculation part 686 is supplied to the body 4 through the output part 690 and the communication part 80.

The information on the received light output by the light receiver 64 is used for controlling an exposure period of the imaging element 60 and a projection light pulse width, so that control is performed to project light having laser light power that conforms to Class 1 or 2 of the safety standard set by the user. With reference to FIG. 6B, the information on the received light output by the light receiver 64 is input to the peak received light intensity detector 682, and the peak received light intensity detector 682 detects the peak received light intensity. This actual peak received light intensity is input to a comparator 1020. In the comparator 1020, the actual peak received light intensity is compared with a predetermined target range 1032 in the height direction of the peak received light intensity stored in the memory, and an exposure period adjustment part 1024 adjusts the exposure period on the basis of this comparison.

Then, this information is supplied to an exposure signal generator 1026, and the exposure signal generator 1026 generates exposure period information and supplies the exposure period information to the CMOS control circuit 1010 (FIG. 6A). The CMOS control circuit 1010 drives the imaging element 60 on the basis of the exposure period determined by the exposure period adjustment part 1024.

With reference to FIG. 6B, the comparison information generated by the comparator 1020 is supplied to a projection light pulse width adjustment part 1030. The projection light pulse width adjustment part 1030 adjusts the projection light pulse width on the basis of the comparison information, this information is supplied to a projection light pulse generator 1040, the projection light pulse generator 1040 determines the projection light pulse width, and the light projecting switch circuit 534 (FIG. 6A) is controlled on the basis of the projection light pulse width and predetermined light projecting intervals. The projection light pulse width adjustment part 1030 and the exposure period adjustment part 1024 serve as a feedback controller 1032 for peak received light intensity. The feedback controller 1032 performs feedback control on the exposure period, the projection light pulse width, and a projection light current amount on the basis of the information on the received light output by the light receiver 64. Two operation modes may be prepared for the green LD 520, and a first mode in which the green LD 520 operates in Class 1 and a second mode in which the green LD 520 operates in Class 2 may be selectively used. It is preferable that the first mode can be selected, for example, for optical axis adjustment and/or inspection, and the second mode can be selected for tuning or operation. Further, the projection light pulse width may be set by the user under a certain restriction.

That is, the projection light pulse width adjusted by the projection light pulse width adjustment part 1030 is reflected in a received light intensity target value 1042 (FIG. 6B) of the monitor PD 522 (FIG. 6A), so that the projection light pulse width is used for feedback control applied to control on the amount of current supplied to the green LD 520. That is, a monitor received light intensity feedback controller 1050 includes a comparator 1052 that compares an actual monitor received light intensity of the monitor PD 522 (FIG. 6A) with the monitor PD received light intensity target value 1042, and comparison information generated by the comparator 1052 is supplied to a projection light current amount controller 1054. The projection light current amount controller 1054 generates a current amount control signal that reduces the projection light current amount when the actual monitor received light intensity is greater than the target value 1042 and increases the projection light current amount when the actual monitor received light intensity is less than the target value 1042, and the current amount control signal is supplied to the current control circuit 532 (FIG. 6A). The above-described overcurrent signal is supplied to a failure detector (limiter) 1056, and upon receipt of the overcurrent signal, the failure detector 1056 interrupts the projection light current or controls the projection light pulse generator 1040 and the projection light current amount controller 1054 to suppress the overcurrent.

In FIG. 6B, the light projecting controller 680 is shown together with the peak position distance correspondence table 692 and the distance determination threshold 694, but this is to avoid lines from becoming complicated, and it should be understood that the peak position distance correspondence table 692 and the distance determination threshold 694 are registered in the memory.

With reference to FIG. 6B, the output of the gyro sensor serving as the motion sensor 50 described above is input to an optical axis displacement detector 696. The optical axis displacement detector 696 reads the threshold from a memory reference part 698, and supplies optical axis displacement detection information to the output part 690 when the output of the gyro sensor (motion sensor 50) is equal to or greater than the threshold. This optical axis displacement detection information is supplied to the body 4 through the communication part 80.

The head 2 includes a failure detector 1080, and when an abnormality occurs in the operation of the head 2, the front operation indicator lamp 70 and the output part operation indicator lamp 76 are driven through an indicator lamp controller 1082 to blink in red. Further, the indicator lamp controller 1082 supplies an abnormality occurrence signal to the body 4 through the communication part 80 to cause the body operation indicator lamp 14 to blink in red.

Figure 7:
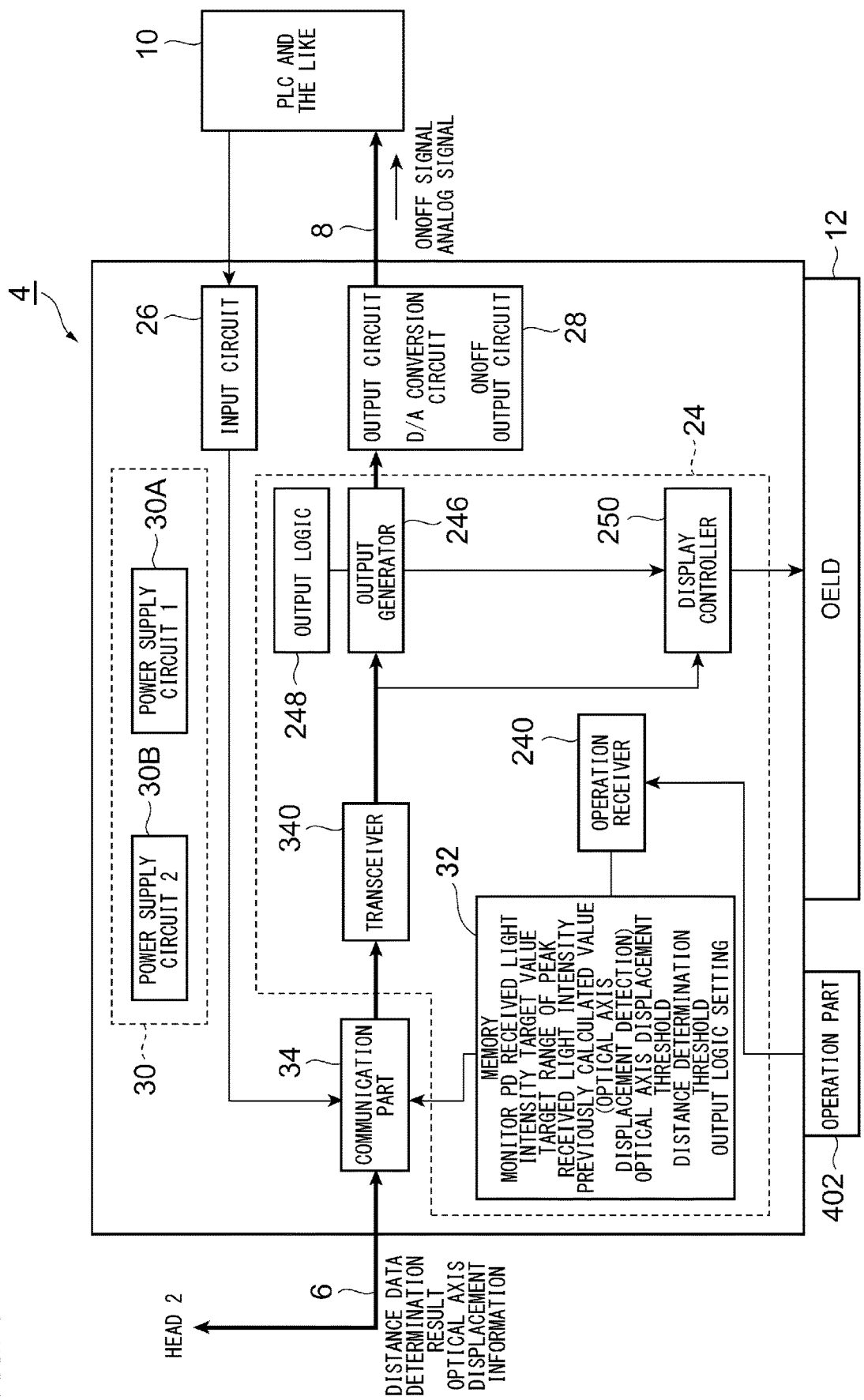
FIG. 7 is a block diagram for describing a control system of the body.

FIG. 7 is a block diagram for describing a control system of the body 4. The body 4 includes a processor 24, an input circuit 26, an output circuit 28, a power supply circuit 30, and a communication part 34. An operation part 402 shown in FIG. 8 corresponds to the SET button 16, the UP button 18, the DOWN button 20, and the mode button 22. The user can perform, by operating the operation part 402, a tuning setting, mask setting, threshold setting of the gyro sensor (motion sensor 50), output logic setting of the body 4, clear input, and the like. When optical axis displacement is detected on the basis of the signal from the motion sensor 50, an alarm signal is generated, and this alarm signal is held until a clear instruction is given. When the user operates the operation part 402, this operation is received by an operation receiver 240, and when the user performs an operation of changing, for example, the optical axis displacement threshold or the distance determination threshold, the optical axis displacement threshold or the distance determination threshold stored in the memory 32 is updated.

Measurement information containing the information on the received light received from the head 2 through the communication part 34 and a transceiver 340 is supplied to an output generator 246 through the transceiver 340. The output generator 246 generates the determination ON/OFF signal on the basis of determination data received from the head 2 and an output logic 248 set by the user. The determination ON/OFF signal is supplied to an external device through the output circuit 28 and the output cable 8.

Upon receipt of a failure detection signal or an optical axis displacement detection signal, the output generator 246 immediately supplies an alarm signal to the outside through the output circuit 28. Further, the output generator 246 supplies the optical axis displacement detection information to a display controller 250, and the display controller 250 controls rendering on the OELD 12 on the basis of the optical axis displacement detection information. The OELD 12 displays a notification of the occurrence of optical axis displacement.

The measurement information containing the information on the received light containing the determination threshold received from the head 2 is supplied to the display controller 250, and the display controller 250 controls rendering on the OELD 12 on the basis of the measurement information containing the information on the received light. The OELD 12 displays the measurement information.

Figure 8:
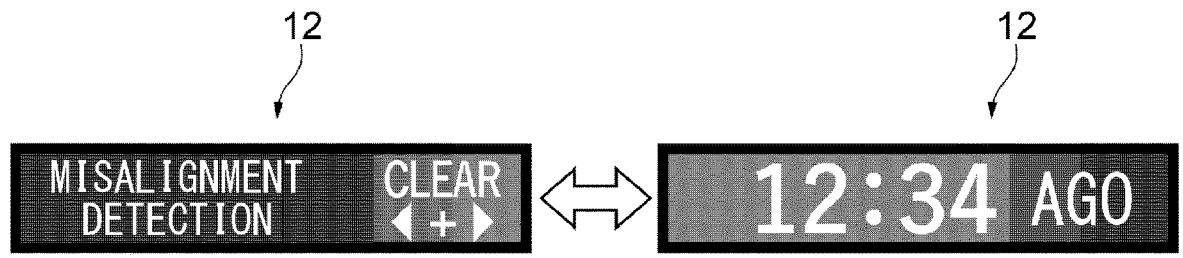
FIG. 8 is a diagram for describing a display example on an OELD serving as a display of the body when optical axis displacement occurs.

FIG. 8 shows a display example on the OELD 12 when an abnormality such as optical axis displacement occurs. An alarm display includes a first alarm display mode in which "misalignment detection" is displayed in characters, and a second alarm display mode in which an elapsed time from a time when the displacement amount based on an angular velocity detected by the gyro sensor is detected to be greater than or equal to the threshold. It is preferable that the first and second alarm display modes be alternately displayed.

Figure 9:
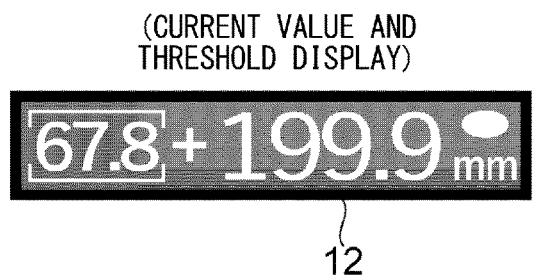
FIG. 9 is a diagram for describing that a current value and a threshold are displayed in a numerical form on the OELD during operation.
Figure 10:
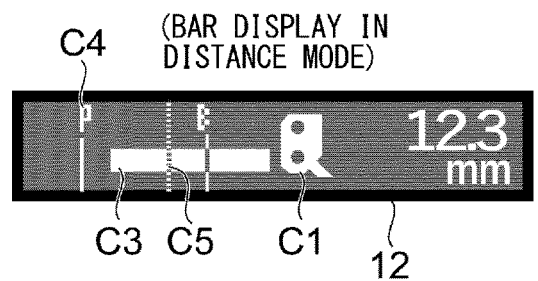
FIG. 10 is a diagram for describing a specific example of a bar display when displayed in a distance mode for threshold setting.
Figure 11:
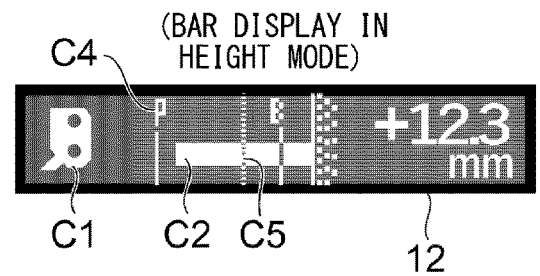
FIG. 11 is a diagram for describing a specific example of the bar display when displayed in a height mode for threshold setting.

FIGS. 9 to 11 show display examples on the OELD 12 during operation or threshold setting. During operation, either a numerical display mode (FIG. 9) or a bar display mode (FIGS. 10 and 11) can be selected. In the numerical display mode, the current value (199.9 mm in the illustrated example) and the threshold (67.8 in the illustrated example) are displayed in a numerical form (FIG. 9). In the bar display mode, either a distance mode (FIG. 10) or a height mode (FIG. 11) can be selected. In the bar display mode, a character C1 denoting the head 2 is displayed. In the distance mode, the current value of the distance from the head to the workpiece is displayed in the form of a horizontal bar C3 (FIG. 10). In the height mode, the current value of the displacement of the workpiece from the reference plane is displayed in the form of a horizontal bar C2 (FIG. 11). In FIGS. 10 and 11, a reference code C4 is a character of a vertical line including a letter "P" denoting the greatest value among detected values acquired so far. Further, a reference code C5 is a character of a vertical line denoting the threshold. When the user operates the UP/DOWN buttons 18, 20 to change the threshold setting, the threshold character (vertical line) C5 moves in response to this user's operation, and a value of the threshold displayed changes accordingly. The user can adjust the threshold while viewing the bar display of the current value and the display of the greatest value on the OELD 12, and confirming the position of the threshold character C5. Note that a numerical value "12.3" shown in FIGS. 10 and 11 denotes the current value.

Figure 12:
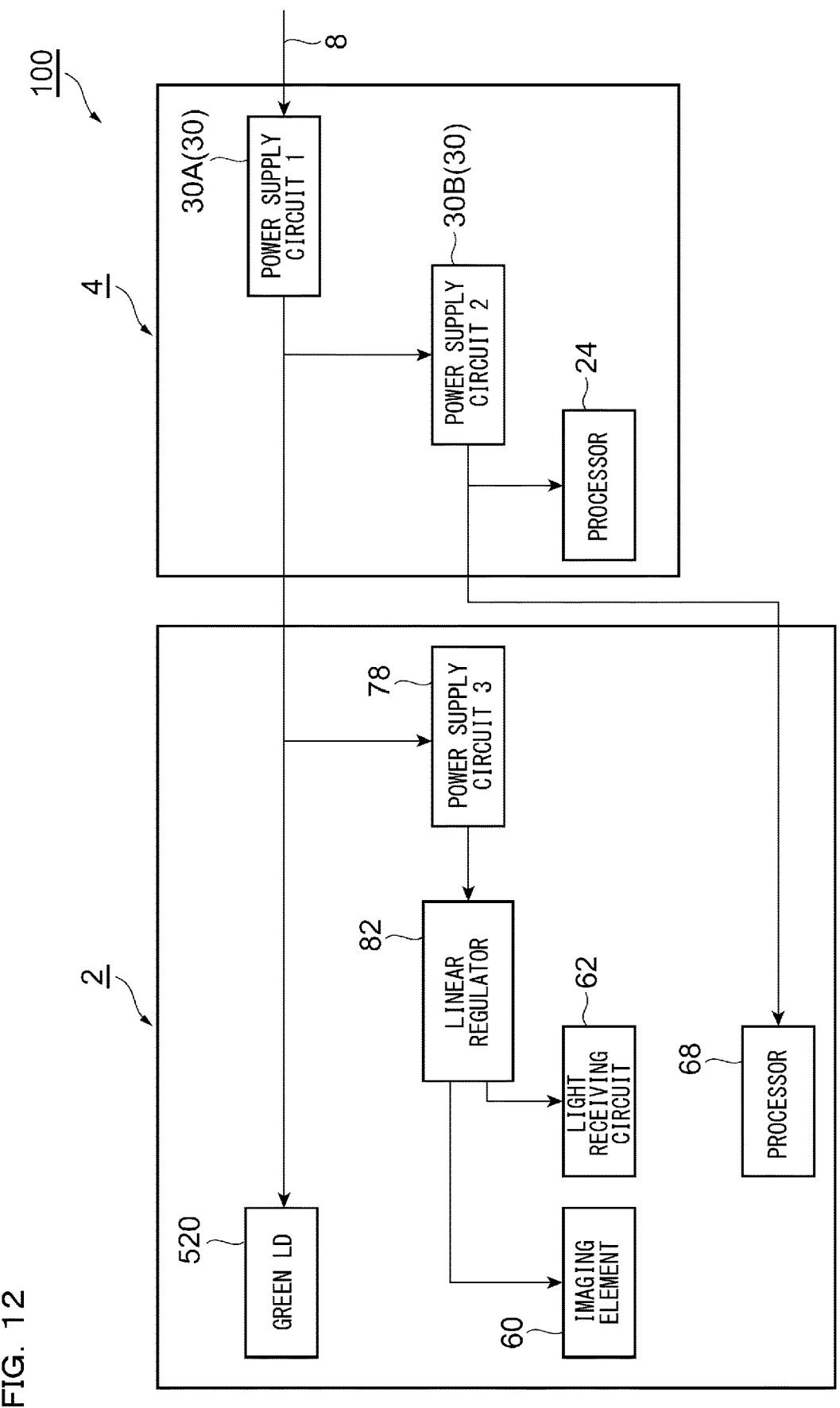
FIG. 12 is a diagram for describing power supply circuits included in the head and the body.

FIG. 12 is a diagram for describing the power supply circuits included in the head 2 and the body 4. The body 4 has the power supply circuit 30 built therein. The power supply circuit 30 includes two power supply circuits 30A, 30B. One power supply circuit 30A regulates a voltage of the power source received from the outside and supplies the voltage thus regulated to the other power supply circuit 30B and the head 2. The other power supply circuit 30B regulates and supplies the voltage to the processor 24 and the head 2. In the head 2, the motion sensor (gyro sensor) 50 and the processor 68 are driven by the power received from the body 4, and the green LD 520 is driven. The second power supply circuit 78 of the head 2 regulates the voltage, and the voltage thus regulated is stabilized by a linear regulator 82 and then supplied to the imaging element 60 and the light receiving circuit 62.

FIG. 13 is a flowchart for describing the control of the processor 68 that puts a limit on the intensity and power of the LD 520 (FIG. 6) that emits the green laser light. With reference to FIG. 13, in step S1, the projection light pulse generator 1040 (FIG. 6B) generates the light projecting signal at the predetermined light projecting intervals. In the next step S2, the green LD 520 is driven with a preset amount of current. In the next step S3, the monitor received light intensity feedback controller 1050 in the light projecting controller 680 of the processor 68 determines whether the intensity of the light received by the monitor PD 522 (FIG. 6A) falls within a specified range. When it is determined to be NO, that is, the intensity of the received light falls out of the specified range, the process proceeds to step S4 to determine whether this deviation has continuously occurred at least a predetermined number of times. When it is determined to be YES, that is, the deviation has continuously occurred at least the predetermined number of times in this step S4, it is considered that some failure has occurred, and the light projection by the green LD 520 is interrupted (S5). When it is determined to be NO in step S4, the process proceeds to step S6 to regulate the amount of current for controlling the green LD 520, and the process returns to step S2. As described in step S3 and the like, monitoring the intensity of monitor emitted light at a plurality of locations makes it possible to guarantee, even when one of them fails, operation based on the laser class that can ensure predetermined safety.

Steps S3 to S6 described above substantially serve as a limiter that puts a limit on the intensity and power of the green laser light. The intensity and power of the green laser light emitted by the light projector 52 is limited to a level that does not affect the user even when the user checks, with the naked eye, the position of the spot of the green laser light that impinges on the workpiece. This limit may be set in accordance with the safety standard "Class 1" or "Class 2". Green has a wavelength of 500 nm to 555 nm, and is excellent in relative luminosity (bright relative luminosity and dark relative luminosity) as compared to the other colors. Therefore, the visibility of the spot can be ensured even when the intensity and power of the green laser light is limited to the above level.

Two operation modes may be prepared for the green LD 520, and the first mode in which the green LD 520 operates in Class 1 and the second mode in which the green LD 520 operates in Class 2 may be selectively used in accordance with a user's setting. It is preferable that the first mode can be selected, for example, for optical axis adjustment and/or inspection, and the second mode can be selected for teaching or operation. Further, the projection light pulse width may be set by the user under a certain restriction.

In the triangulation sensor 100, control is performed to keep the light receiving signal within an appropriate signal intensity in order to correctly calculate the distance from the light receiving signal. FIGS. 14A to 14C are diagrams for describing an explanation when the intensity of received light is too high and an explanation when the intensity of received light is too low. FIG. 14A shows a case where the intensity of the received light is too high. When the intensity of the received light exceeds a saturation point, a peak portion of a received light waveform disappears, so that the position of the peak cannot be accurately grasped. FIG. 14B shows a case where the intensity of the received light is too low. When the intensity of the received light is low, the peak of the received light waveform becomes low as a whole, so that the peak position cannot be accurately grasped. With reference to FIG. 14C, the exposure time of the imaging element 60 is controlled by an electronic shutter (not shown). According to the embodiment, control is performed such that the exposure time is changed on the basis of the peak light intensity of the light receiving signal, when the intensity of the received light is too high, the exposure time is made shorter to reduce the intensity of the received light to make the peak of the received light waveform lower, and when the intensity of the received line is too high, the exposure time is made longer to increase the intensity of the received light to make the peak of the received light waveform higher. Changing the exposure time of the imaging element 60 causes the intensity of light received by the imaging element 60 to change.

Regarding the control on the intensity of the received light to optimize the peak of the received light waveform, in addition to the above-described exposure time, a received light gain for the circuit that amplifies the light receiving signal and light emitting power of the green LD 520 are changed to control the intensity of a light emitting signal. It is preferable that the light emitting power of the green LD 520 be increased to distinguish the light emitting signal from a signal generated by ambient light. On this assumption, it is preferable that the peak of the received light waveform be controlled to be appropriate on the basis of the exposure time of the imaging element 60 and the received light gain. The control based on the exposure time of the imaging element 60 has an advantage in that it is relatively easy to introduce the control, but in order to expand an adjustable dynamic range, it is preferable that a combination of the received light gain or the light emitting power and the exposure time be employed.

Figure 15:
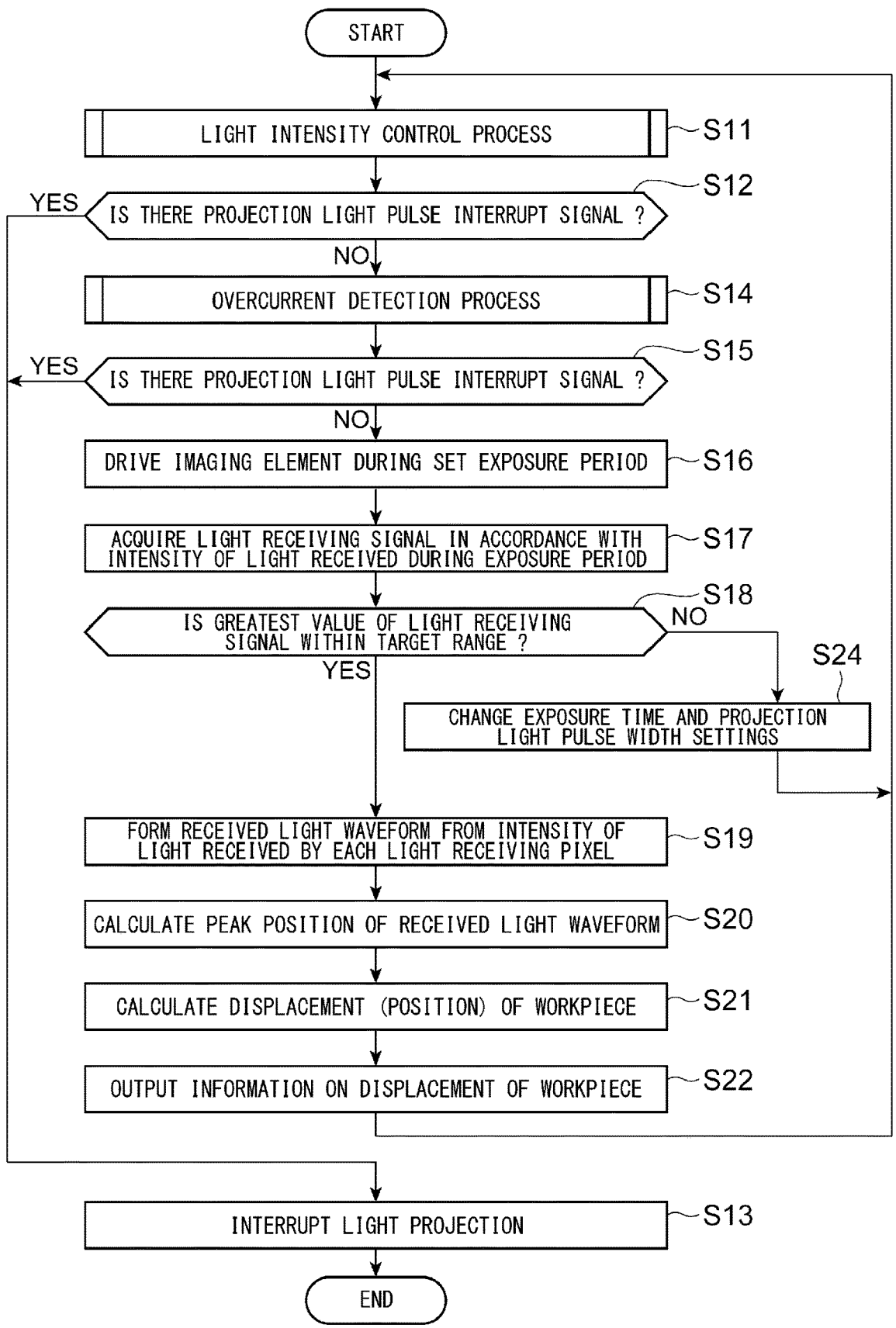
FIG. 15 is a flowchart showing an example of a process of controlling the intensity of laser light by changing settings of an exposure time of an imaging element and projection light pulse width.

As described above, the green laser light has advantages in high relative luminosity and high visibility for workpieces with low reflectivity. However, for a white workpiece or a metal workpiece having high reflectivity, for example, the user may feel that the spot is too dazzling. Such a dazzling spot interfere with optical axis adjustment. From this point of view, it is preferable that control be performed to change the light emitting power in accordance with a surface texture of the workpiece. As a specific example, a flowchart shown in FIG. 15 represents an example of the control to change the projection light pulse width in addition to the changing of the exposure time. The current value may be changed instead of the projection light pulse width. When the projection light pulse width is equal to or larger than the exposure time of the imaging element 60, the detection performance of the sensor is not deteriorated.

Figure 16:
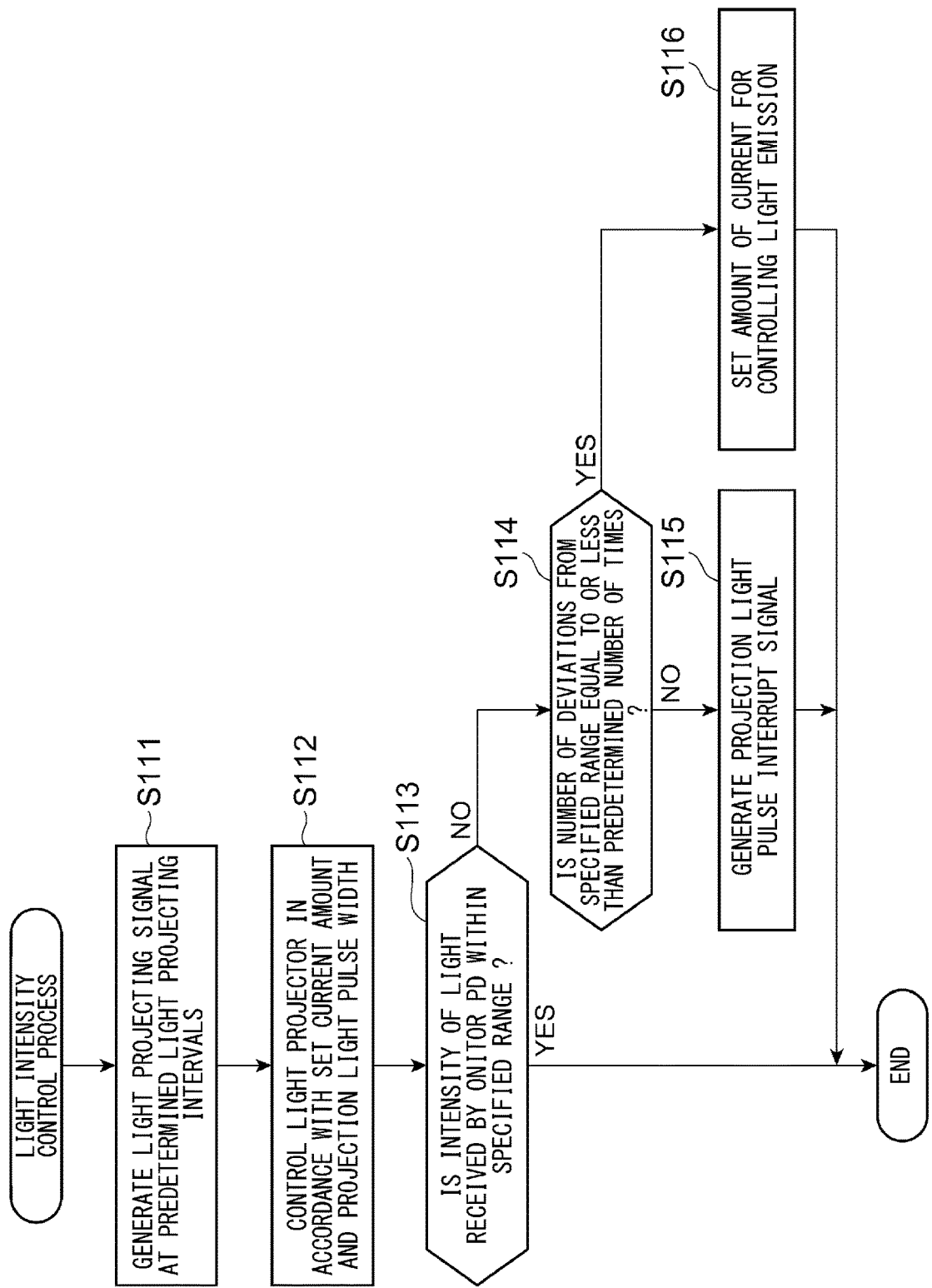
FIG. 16 is a flowchart showing an example of a light intensity control process.

With reference to FIG. 15, the light intensity control process is performed in step S11. FIG. 16 is a flowchart for describing an example of the light intensity control process. In step S111 of FIG. 16, the light projecting signal is generated by the projection light pulse generator 1040 at the predetermined light projecting intervals. In the next step S112, the light projector 52 is controlled in accordance with the set current amount and projection light pulse width. In step S113, a determination is made as to whether the intensity of light received by the monitor PD 522 used for feedback control on the intensity of projection light falls within a specified range, and when it is determined to be NO, the process proceeds to step S114 to determine whether the number of deviations from the specified range is equal to or less than the predetermined number of times. This predetermined number of times depends on the laser class regulation set by the user, and when the laser class regulation cannot be guaranteed, a signal to interrupt the projection light pulse is generated (S115). In a case where no problem arises when the light power of the green LD 520 under control is based on the viewpoint of the laser class that guarantees safety, a signal to interrupt the light projection pulse may be generated only when a response time cannot be guaranteed. In step S114, when the number of deviations from the specified range is equal to or less than the predetermined number of times, it is determined to be YES, and the process proceeds to step S116 to set the amount of current for controlling the light emission.

Returning to the flowchart of FIG. 15, in step S12, the projection light pulse generator 1040 (FIG. 6B) determines whether there is the signal to interrupt the projection light pulse. When there is the interrupt signal, the process proceeds to step S13 to interrupt the light projection. When there is no signal to interrupt the projection light pulse in step S12, the process proceeds to step S14 to perform the overcurrent detection process.

Figure 17:
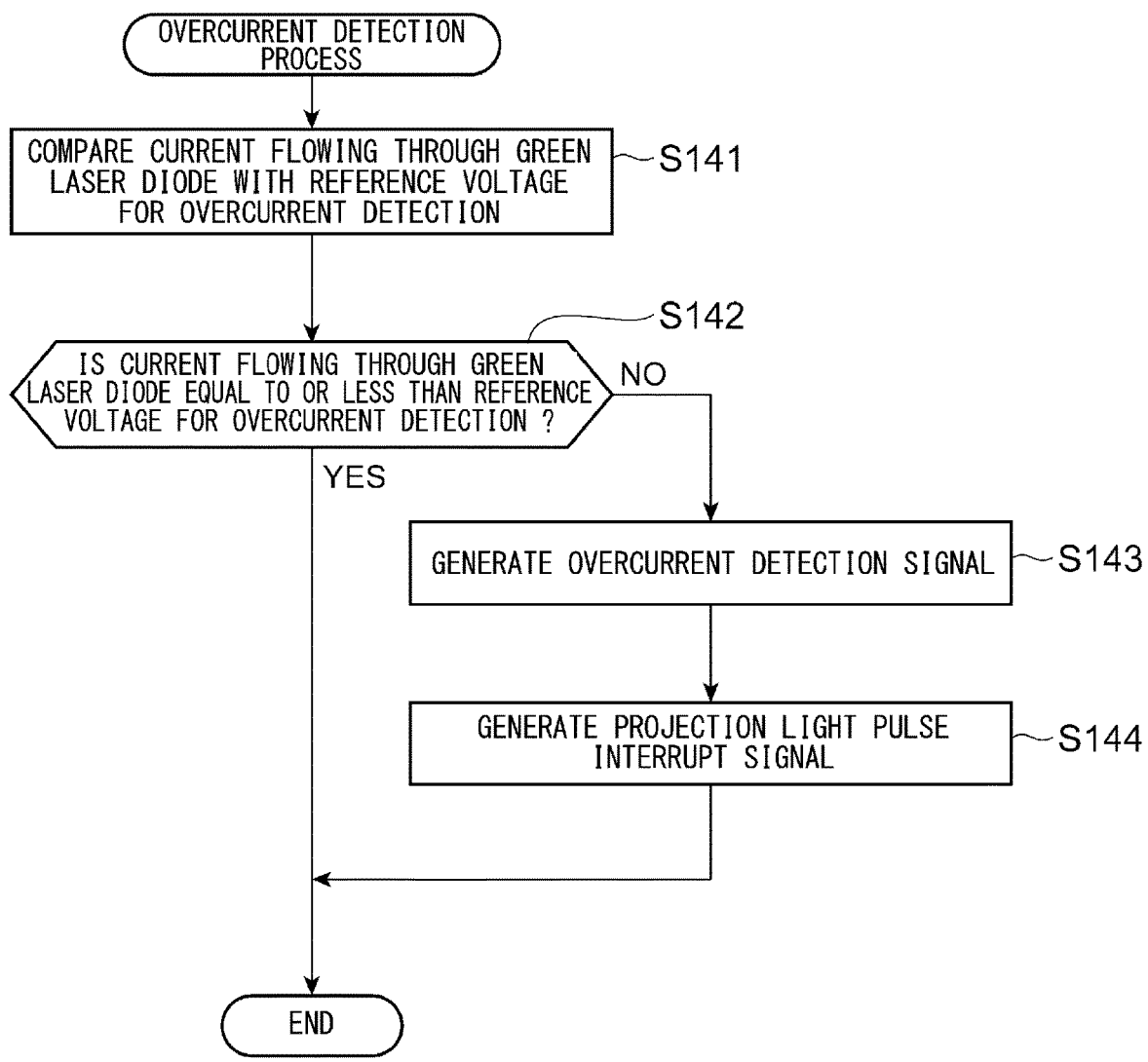
FIG. 17 is a flowchart showing an example of an overcurrent detection process.

FIG. 17 is a flowchart for describing an example of the overcurrent detection process. In step S141 of FIG. 16, the current flowing through the green LD 520 is converted into a voltage, and a comparison is made between the voltage and the reference voltage for overcurrent detection to determine whether the voltage based on the current flowing through the green LD 520 is equal to or less than the reference voltage for overcurrent detection (S142). When the voltage based on the current flowing through the green LD 520 is higher than the reference voltage for overcurrent detection, it is determined to be No, and the process proceeds to step S143 to generate the overcurrent detection signal and to generate the signal to interrupt the projection light pulse (S144).

Returning to FIG. 15, in step S15, a determination is made as to whether there is the projection light pulse interrupt signal. When there is the projection light pulse interrupt signal, the process proceeds to step S13 to interrupt the light projection. When there is no projection light pulse interrupt signal, the process proceeds to step S16 to drive the imaging element 60 at a set timing and during the exposure period and to acquire the light receiving signal in accordance with the intensity of light received during the exposure period (S17). Then, in the next step S18, a determination is made as to whether the greatest value of the light receiving signal falls within the target range, and when the greatest value of the light receiving light signal falls within the target range, it is determined to be YES, and the process proceeds to step S19 to add up the intensity of light received by each light receiving pixel to form a received light waveform. In the next step S20, the position of the peak of the received light waveform is calculated, displacement (position) of the workpiece is calculated from this peak position (S21), information based on the displacement of the workpiece thus calculated is output (S22), and then the process returns to step S11. The output in step S22 may be a case where the displacement of the workpiece is output or a case where the determination ON/OFF signal is generated on the basis of a comparison with the threshold.

In step S20, the peak position of the received light waveform is calculated as follows.

(1) When the peak position can be acquired from the received light waveform, the peak position is determined to be the peak position thus acquired.
(2) When the intensity of the received light is too high and causes saturation, the peak position is estimated from the received light waveform acquired.
(3) When the peak position can be acquired when the intensity of the received light is too low to fall out of the target range, the peak position is determined to be the peak position thus acquired.
(4) When the intensity of the received light is too low to prevent the peak position from being detected, it is considered that the workpiece exists at the farthest or closest position set in advance.

When the greatest value of the light receiving signal falls out of the target range in step S18, the process proceeds to step S24 to change the exposure time and projection light pulse width settings in order to optimize the intensity of the received light, and then the process returns to step S11.

Figure 18A:
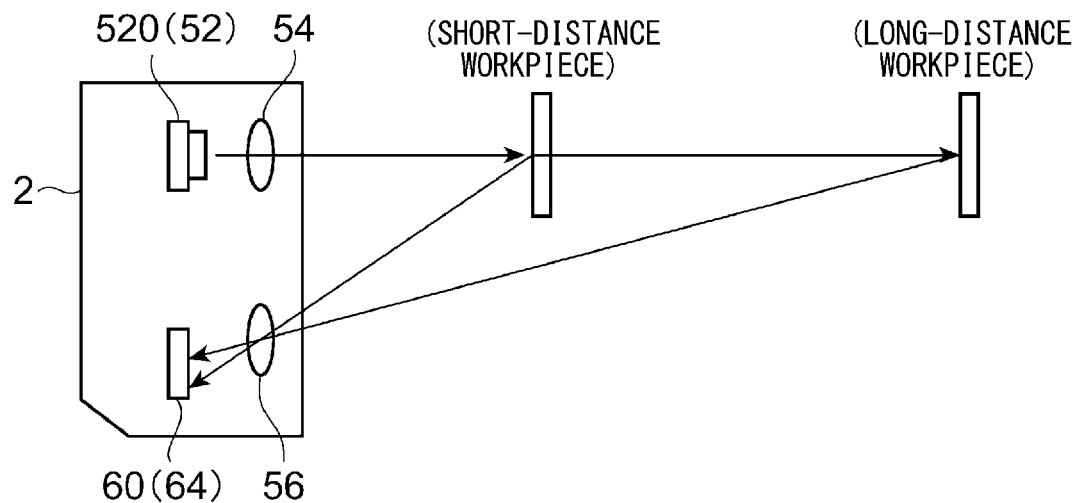
FIG. 18A is a diagram for describing that a position of an image of a spot in an imaging element changes in a manner that depends on a distance to a position of a workpiece.
Figure 18B:
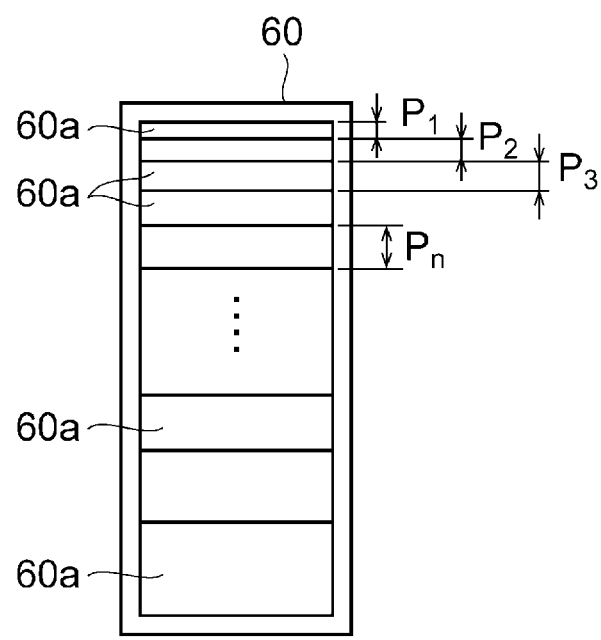
FIG. 18B is a diagram for describing an image of image pixels arranged at unequal intervals.

FIG. 18A is a diagram for describing that, for example, in the imaging element 60 made of a CMOS, a portion that receives the reflected light differs in a manner that depends on the distance to the workpiece. In the illustrated example, when the workpiece is located at a short distance, the image of the spot is formed in a lower portion of the imaging element 60 (FIG. 18B). Further, as will be described next, the image of the spot is relatively large. On the other hand, when the workpiece is located at a long distance, the image of the spot is formed in an upper portion of the imaging element 60. Further, as will be described next, the image of the spot is relatively small (FIG. 18B). As will be described later, the imaging element 60 is designed such that the group of pixels 60a of the imaging element 60 preferably has a width that becomes larger from the portion that receives light when the workpiece is located at a long distance toward the portion that receives light when the workpiece is located at a short distance. Herein, the width of the pixels 60a substantially means an interval between two adjacent pixels 60a, that is, between the center of the first pixel and the center of the second pixel.

FIGS. 19A to 19D are diagrams for describing that, in the imaging element 60 made up of the plurality of pixels 60a, a portion that receives a spot image SP differs and the size of the spot image SP varies in a manner that depends on a distance to the workpiece. FIG. 19B shows that a spot is formed at one end of the group of pixels 60a of the imaging element 60 when the workpiece is located at a short distance. FIG. 19C shows that a spot is formed at an intermediate portion of the group of pixels 60a of the imaging element 60 when the workpiece is located at an intermediate position. FIG. 19D shows that a spot is formed at the other end of the group of pixels 60 of the imaging element 60 when the workpiece is located at a long distance.

As can be seen from FIG. 19B, the spot image SP becomes larger when the workpiece is located at a short distance, and the spot image SP becomes smaller when the workpiece is located at a long distance (FIG. 19D). In a case where the pixels 60a of the imaging element 60 are arranged at equal intervals, in the illustrated example, when the workpiece is located at a short distance, the light is received by seven pixels 60a. On the other hand, when the workpiece is located at a long distance, the light is received by one pixel 60a.

When the workpiece is located at a short distance, and light representing the spot image SP is received by the plurality of pixels 60a (FIG. 19B), the number of pixels 60a that receive the light is large, and a received light waveform can approximate to a curve on the basis of data on light received by the plurality of pixels 60a, thereby increasing the accuracy of estimating the peak position of the received light intensity. On the other hand, when the workpiece is located at a long distance, and light representing the spot image SP is received by, for example, one pixel 60a (FIG. 19D), the peak position of the received light intensity cannot be estimated because the received light waveform cannot approximate to a curve. It is desirable that the width of each of light receiving pixels 60a be smaller in order to cause the received light waveform to approximate to a curve even when the workpiece is located at a long distance. On the other hand, when the width of each of the light receiving pixels a is made smaller, the number of pixels of the entire imaging element increases, and a processing load increases accordingly.

To solve this problem, it is preferable that the imaging element 60 mounted on the head 2 be designed such that the width of the pixel 60a varies in a manner that depends on a distance to the workpiece. FIGS. 20A to 20D are conceptual diagrams for describing an example where the imaging element 60 is designed such that the width of the pixel 60a gradually decreases from the short distance side toward the long distance side. FIG. 20A is an image diagram of the imaging element 60 having pixels 60a arranged at unequal intervals. The size of the spot image SP formed by the imaging element 60 is determined in accordance with a detection range of the head 2. FIG. 20B shows a spot image formation position and the spot image SP when the workpiece is located at a short distance. FIG. 20C shows a spot image formation position and the spot image SP when the workpiece is located at an intermediate distance. FIG. 20D shows a spot image formation position and the spot image SP when the workpiece is located at a long distance. In the illustrated example, the width of the pixel 60a is defined such that the spot image SP is received by three pixels 60a regardless of the distance to the workpiece. This allows the peak position to be estimated by causing the received light intensity of the three pixels 60a that has received the spot image SP to approximate to a curve regardless of the distance to the workpiece. In addition, the number of pixels of the entire imaging element can be reduced, and the processing load can be reduced because many of the pixels 60a do not receive light. This makes it possible to achieve both peak position detection accuracy and a reduction in processing load. In the illustrated example, the spot image SP is received by the three pixels 60a. This is based on a reason that it is better to receive the spot image SP with at least three pixels 60a in order to cause the received light waveform to approximate to a curve.

Although the spot image SP is represented by a circle or an oval in FIGS. 20B to 20D, the shape of the spot image SP is not limited to the circle or the oval, and may be a rectangle.

Figure 21:
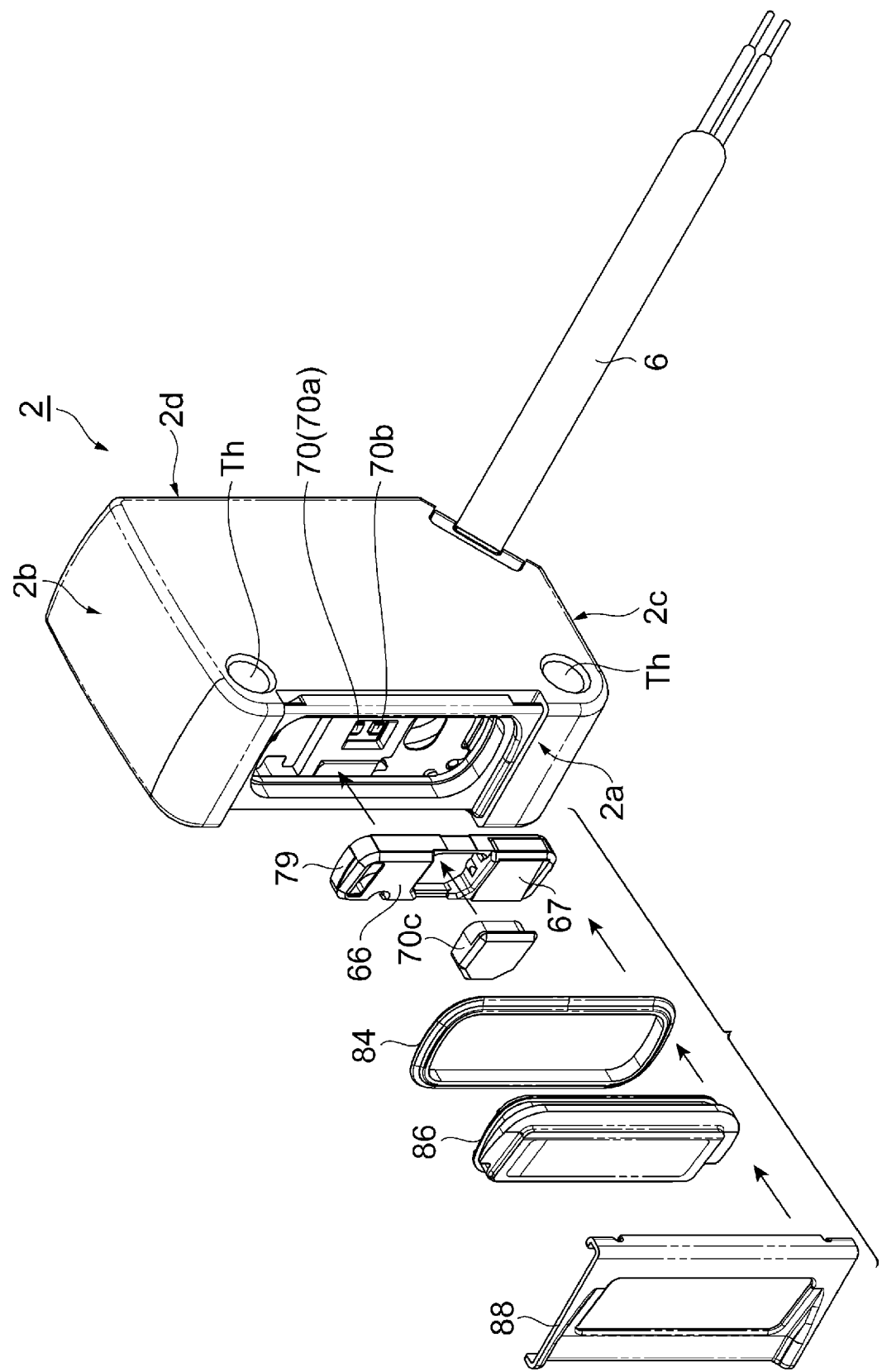
FIG. 21 is an exploded perspective view of a light projecting and receiving part of the head.

FIG. 21 is a block diagram for describing a structure of the light projecting and receiving surface 2a of the head 2. One side surface of the head 2 having a relatively narrow width serves as the light projecting and receiving surface 2a, and this light projecting and receiving surface includes a light guide member holder 79 including the light projecting and receiving windows 66, 68, and a light diffusing member 70c that guides and diffuses, toward the outside, light of a first operation indicator lamp unit 72 located on the light projecting and receiving surface 2a of the head 2, that is, the front surface. The light diffusing member 70c is attached between the light projecting window 66 and the light receiving window 67 of the light guide member holder 79. In FIG. 21, reference numerals 70a, 70b denote light sources of the front operation indicator lamp 70 formed into a unit, 70a denotes a red LED, and 70b denotes a green LED.

A waterproof gasket 84 is disposed on the outside of the light guide member holder 79, and a light-transmissive cover member 86 is disposed on the outside of the waterproof gasket 84. The light-transmissive cover member 86 is fixed by a metal cover holding member 88. The waterproof gasket 84 is compressed by snap-fitting the metal cover holding member 88 to the first housing 2, thereby making the light projecting and receiving surface 2a waterproof.

A waterproof structure substantially the same as the waterproof structure of the head 2, that is, the waterproof gasket 72 (FIG. 5) for the relay cable 6 and the waterproof gasket 84 for the light projecting and receiving surface 2a is applied to the body 4, and the waterproof structure is applied to the body 4 including a portion around the OELD 12, the operation part 402, and the connection parts of the relay cable 6 and the output cable 8.

A reference numeral Th in FIGS. 1, 5, and 21 denotes a mounting through-hole. The mounting through-hole Th is a through hole extending in a direction orthogonal to the direction of the optical axis of the green laser light, and the head 2 is fixed at any desired location with bolts inserted into two mounting through-holes Th that extend in a direction passing through the head 2.

Figure 22:
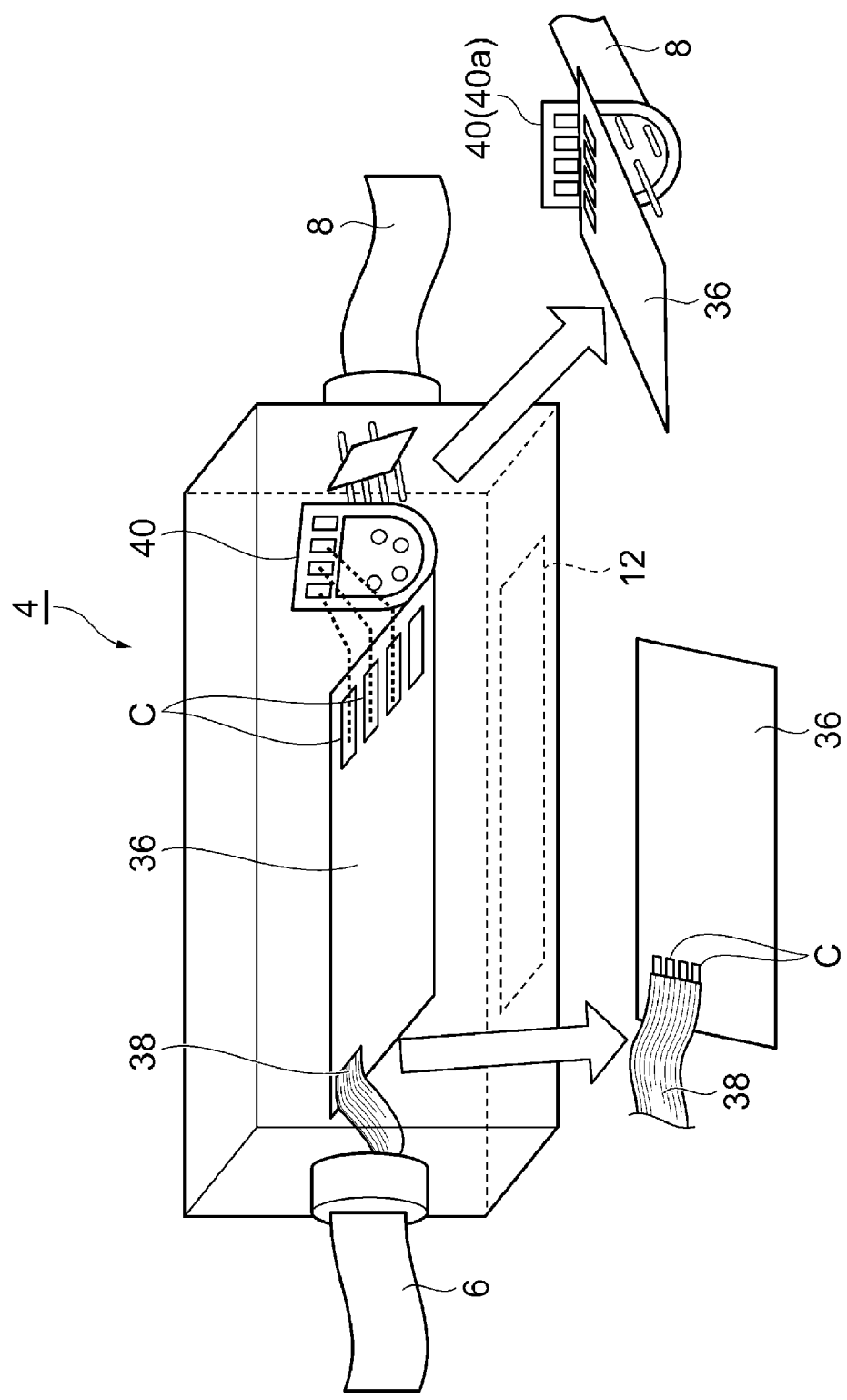
FIG. 22 is a diagram for describing that both a relay cable and an output cable connected to the body are integrally connected to the body by soldering.

FIG. 22 is a diagram for describing that the relay cable 6 and the output cable 8 are connected to a body board 36 built in the body 4 by soldering without a connector. Note that a reference numeral C denotes a contact point of the body board 36. Specifically, the relay cable 6 is connected to a flexible substrate 38, and the flexible substrate 38 is soldered to the body board 36. Note that the other end of the relay cable 6 is soldered to the head 2. That is, the head 2 and the body 4 are connected to each other by soldering both the ends of the relay cable 6. This allows the body 4 and the head 2 to substantially integrated with each other in terms of a circuit structure. According to a description given of the output cable 8, the output cable 8 has a contact point of a vertical relay member 40 soldered to the contact point C of the body board 36. This allows the total length of the body 4 to be shortened. As a modification, a connector may be provided at the end of the body 4 adjacent to the head 2, and the body 4 and the relay cable 6 may be connected to each other by this connector. Further, a connector may be provided at the output side end of the body 4, and the output cable 8 may be connected to this connector.

Figure 23:
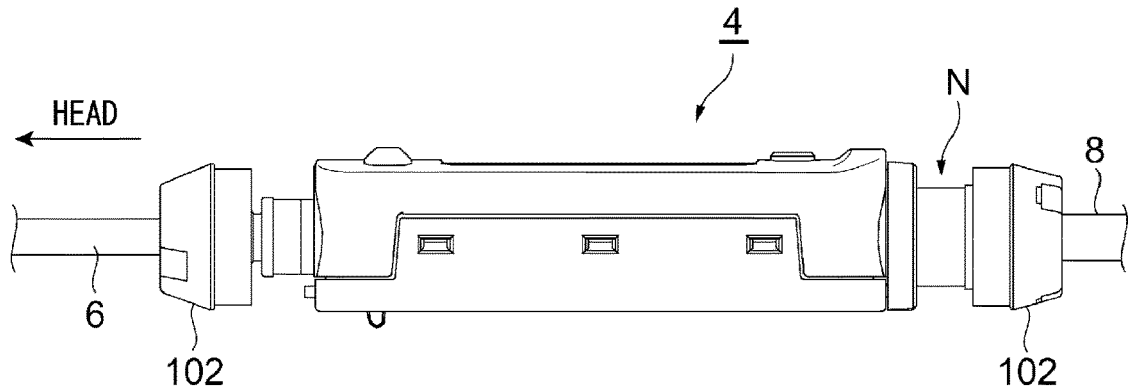
FIG. 23 is a side view for describing a water blocking structure of the body, in which, as faced from the front, a cap on the left side is in a loosened state, and a cap on the right side is in a tightened state.
Figure 24:
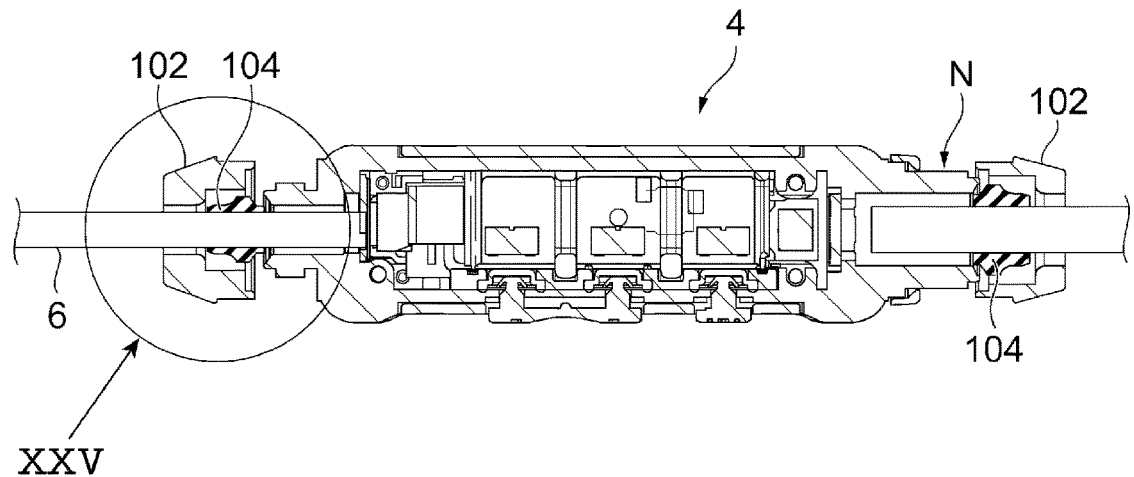
FIG. 24 is a cross-sectional view of the body shown in FIG. 23.
Figure 25:
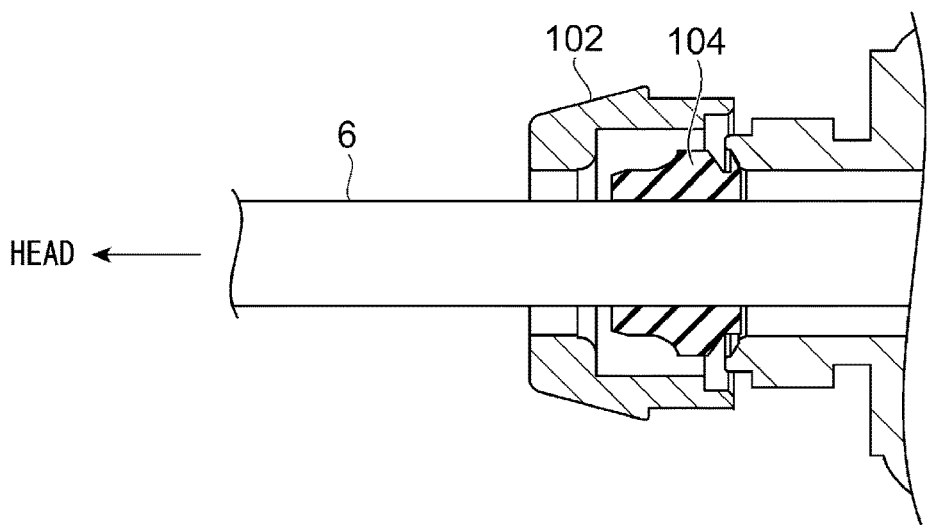
FIG. 25 is an enlarged cross-sectional view of a part at which an arrow XXV shown in FIG. 24 points.
Figure 26:
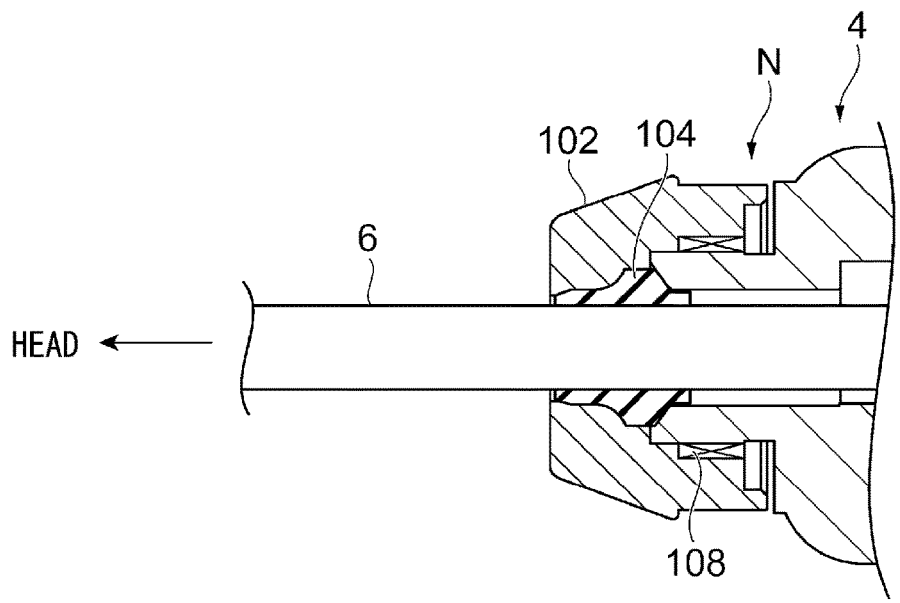
FIG. 26 is an enlarged cross-sectional view corresponding to FIG. 25, showing a state where the cap is closed.

FIGS. 23 to 26 are diagrams for describing the water blocking structure at both ends of the body 4. The body 4 has caps 102 at both the ends, and FIGS. 23 and 24 show a state where the cap 102 adjacent to the head 2 is loosened. FIG. 23 is a side view, and FIG. 24 is a cross-sectional view. FIG. 25 is an enlarged view of a portion indicated by an arrow XXV shown in FIG. 24. A reference numeral 104 denotes a water blocking member, that is, a gasket. Tightening the cap 102 makes the gasket 104 watertight. FIG. 26 is a cross-sectional view corresponding to FIG. 25, showing a state after the cap 102 is tightened. As can be seen from FIG. 26, tightening the cap 102 eliminates a gap between the cap and the body 4 and brings the gasket 104 into a compressed state.

In FIG. 15, a reference numeral 108 denotes a thread. In FIGS. 23 and 24, the neck N is formed inside the cap 102 on the right side of each drawing in a tightened state.

Second Embodiment (FIGS. 27 to 31)

A displacement sensor according to a second embodiment is an optical triangulation sensor provided with a green laser light source as in the first embodiment. A triangulation sensor 200 according to the second embodiment is made up of a head body 202 serving as a first housing and a relay part 204 serving as a second housing, and a relay cable 204 extending from the head body 202 is integrated with the relay part 204. Further, an external connection cable 212 extending from the relay part 204 is also integrated with the relay part 204. That is, both the relay cable 204 and the external connection cable 212 extend from the relay part 204 without a connector.

Figure 27:
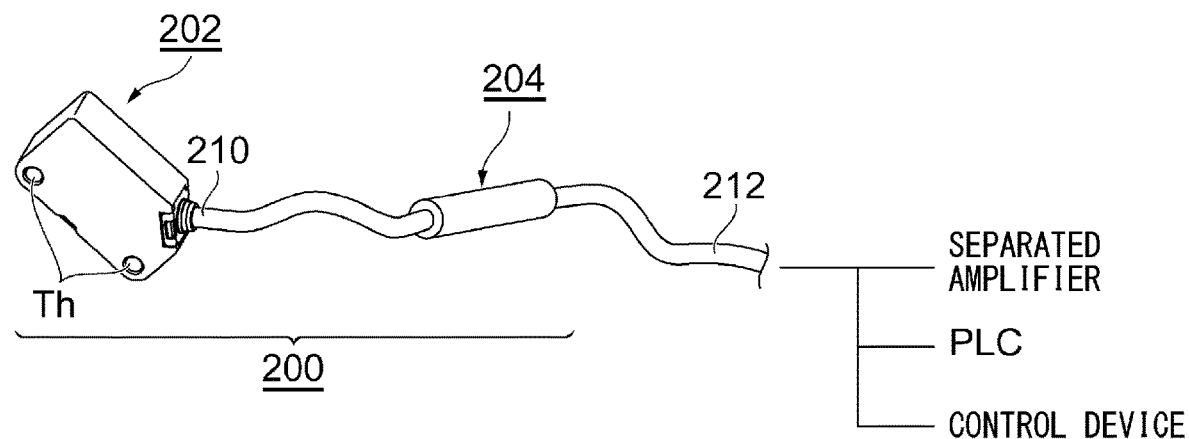
FIG. 27 is a diagram for describing an overall structure of an optical triangulation sensor according to a second embodiment.

In the triangulation sensor 200 according to the second embodiment, the relay part 204 includes a power supply circuit and has no display function. Accordingly, it can be said that the displacement sensor according to the second embodiment is a displacement sensor without a display function. Therefore, as shown in FIG. 27, a usage aspect of the triangulation sensor 200 according to the second embodiment includes an aspect where the triangulation sensor 200 is connected to a PLC or a control device, and an aspect where the triangulation sensor 200 is connected to a separated amplifier having a conventional display function if the user requires a display.

Figure 28A:
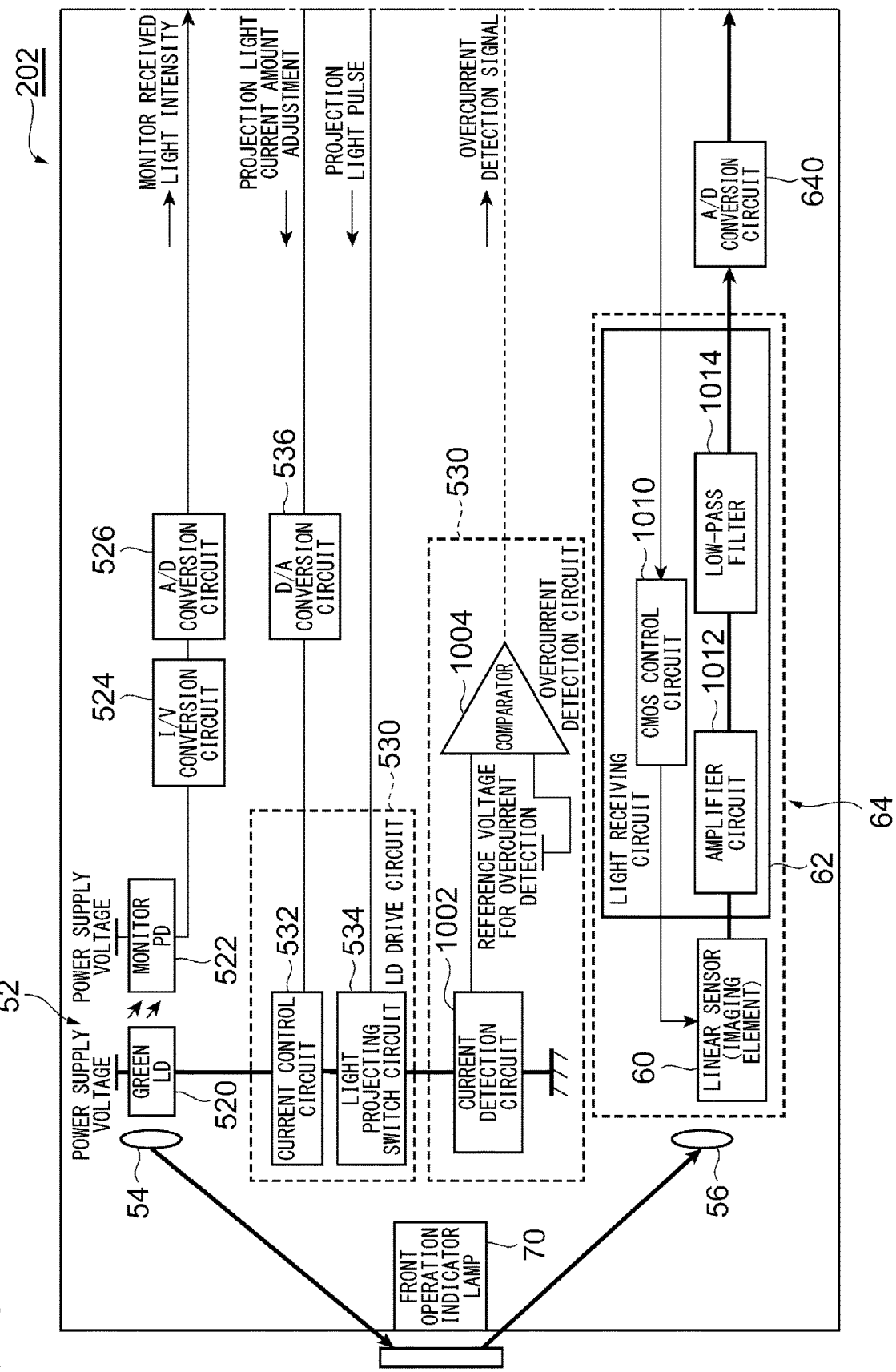
FIG. 28A is a block diagram for describing a control system of a head body included in the second embodiment, showing a part of a head.
Figure 28B:
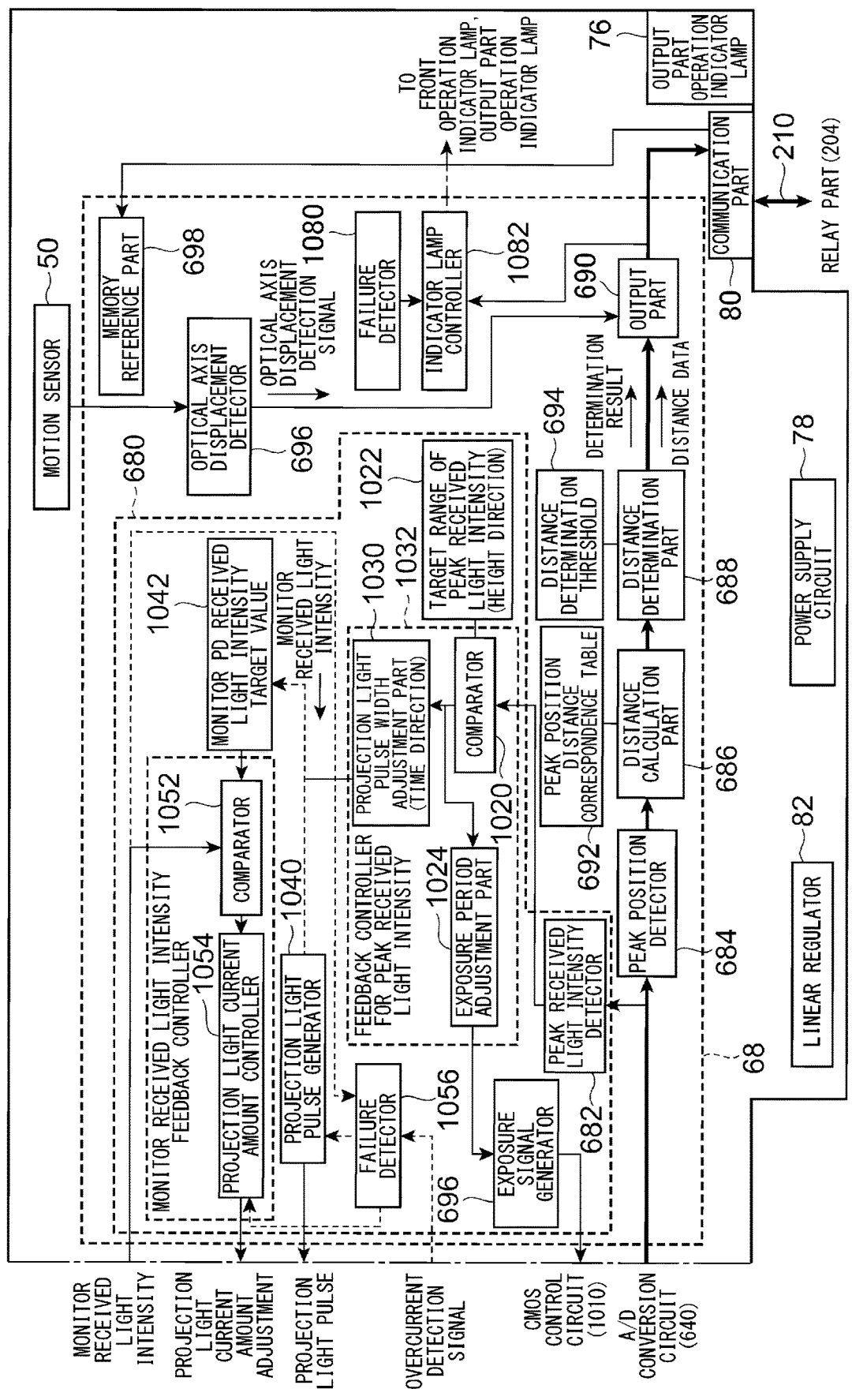
FIG. 28B is a block diagram for describing the control system of the head body included in the second embodiment, showing the other part of the head.

FIGS. 28A and 28B are block diagrams for describing a structure of the head body 202 included in the second embodiment. As can be seen from a comparison with FIGS. 6A and 6B described above, the structure of the head body 202 is the same as the structure of the head 2 included in the first embodiment, and the head body 202 is made up of bare-bones components necessary for measurement using the green laser light source as in the head 2 included in the first embodiment.

As described in the first embodiment with reference to FIG. 6B, the distance determination part 688 (FIG. 28B) generates the determination signal that is a binary signal representing ON/OFF on the basis of a comparison with the determination threshold 694 stored in the memory and supplies the ON/OFF determination signal to an external device through the output part 690, the communication part 80, the relay part 204, and the external connection cable 212.

Figure 29:
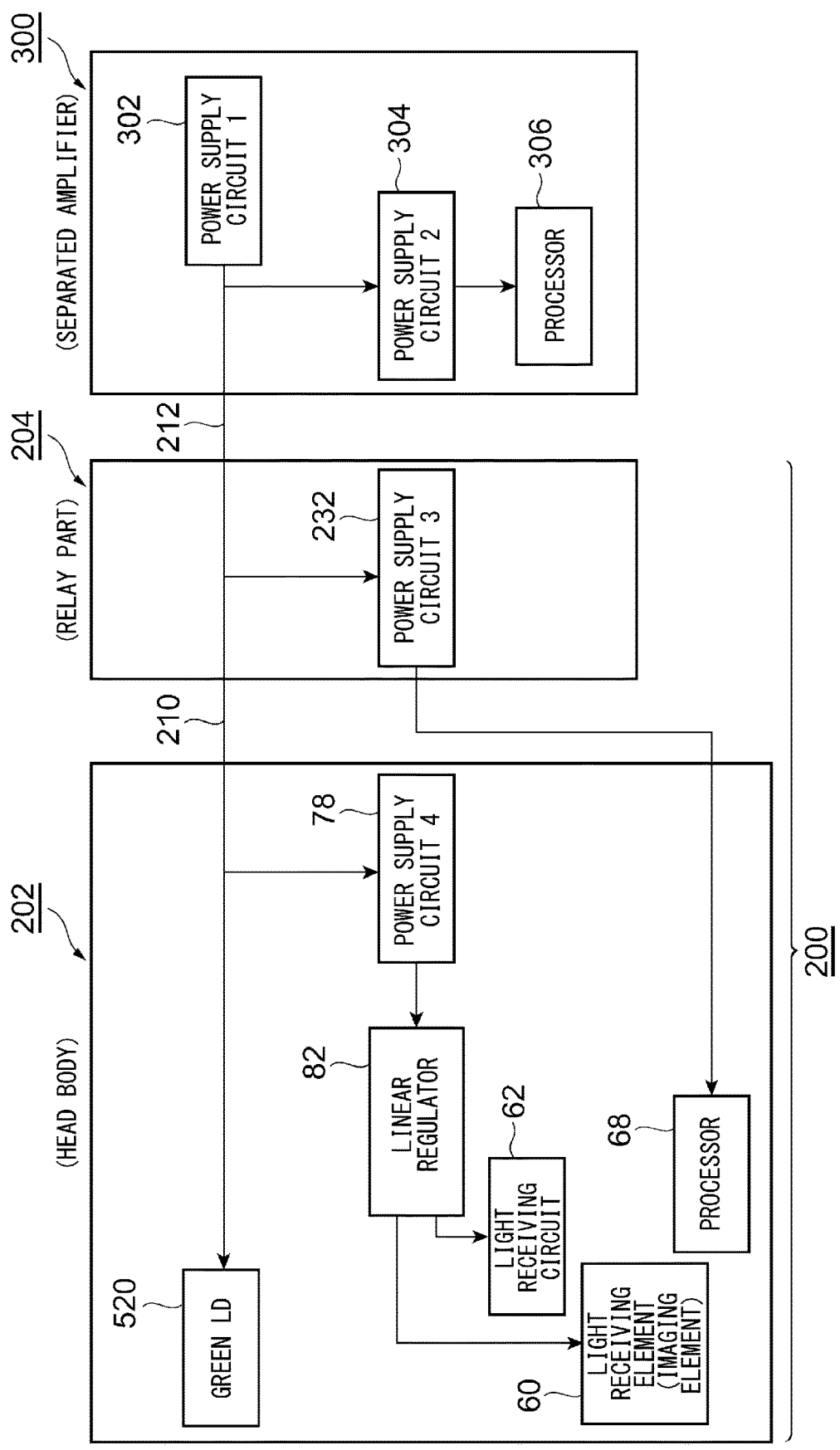
FIG. 29 is a diagram for describing power supply circuits of the head body, a relay part, and a body included in the second embodiment.

FIG. 29 is a diagram for describing power supply circuits included in the triangulation sensor 200 according to the second embodiment. The triangulation sensor 200 is driven by power supplied from an external device to which the triangulation sensor 200 can be connected, that is, a PLC, a separated amplifier, or a control device. FIG. 29 shows an example where the triangulation sensor 200 is connected to a separated amplifier 300. The separated amplifier 300 includes a first power supply circuit 302 and a second power supply circuit 304 that steps down a voltage generated by the first power supply 302, and a processor 306 of the separated amplifier 300 is driven by the second power supply circuit 304.

The relay part 204 included in the triangulation sensor 200 is connected to an external device such as the separated amplifier 300 through the external connection cable 212. The voltage regulated by the first power supply circuit 302 of the separated amplifier 300 is supplied to the triangulation sensor 200 through the external connection cable 212 to drive the green LD 520. A third power supply circuit included in the relay part 204 steps down the voltage generated by the first power supply circuit 302 to generate power for driving the processor 68 of the head body 202. The head body 202 includes a fourth power supply circuit 78, and the fourth power supply circuit 78 steps down the voltage supplied from the first power supply circuit 302. The fourth power supply circuit 78 regulates the voltage to a voltage by which the imaging element 60 and the light receiving circuit 62 are driven.

The relay part 204 has an elongated tubular shape and is several times larger in diameter than the relay cable 210 and the external connection cable 212. This causes the relay part 204 to be morphologically and substantially integrated with the relay cable 210 and the external connection cable 212. Further, the outer shape of the relay part 204 is designed to allow morphological integration.

Figure 30:
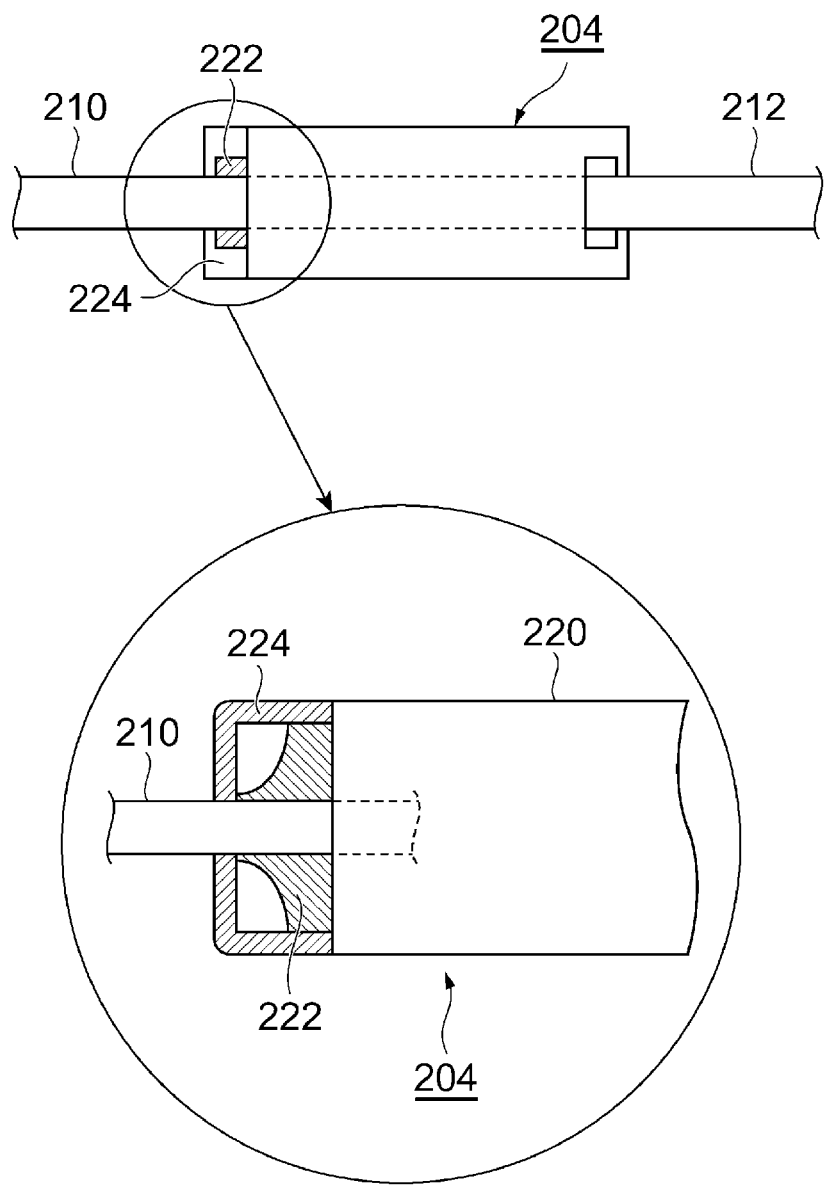
FIG. 30 is a conceptual diagram for describing a waterproof structure of the relay part included in the optical triangulation sensor according to the second embodiment.

The relay part 204 is connected to the relay cable 210 and the external connection cable 212 without a connector. A housing 220 of the relay part 204 is made of resin. The relay part 204 is also provided with a water blocking structure substantially the same as the water blocking structure of the body 4. That is, one end of the resin housing 220 has a gasket 222 that makes the periphery of the first relay cable 210 watertight, and the gasket 222 is compressed by a cap 224 around the gasket 222 (FIG. 30).

Figure 31:
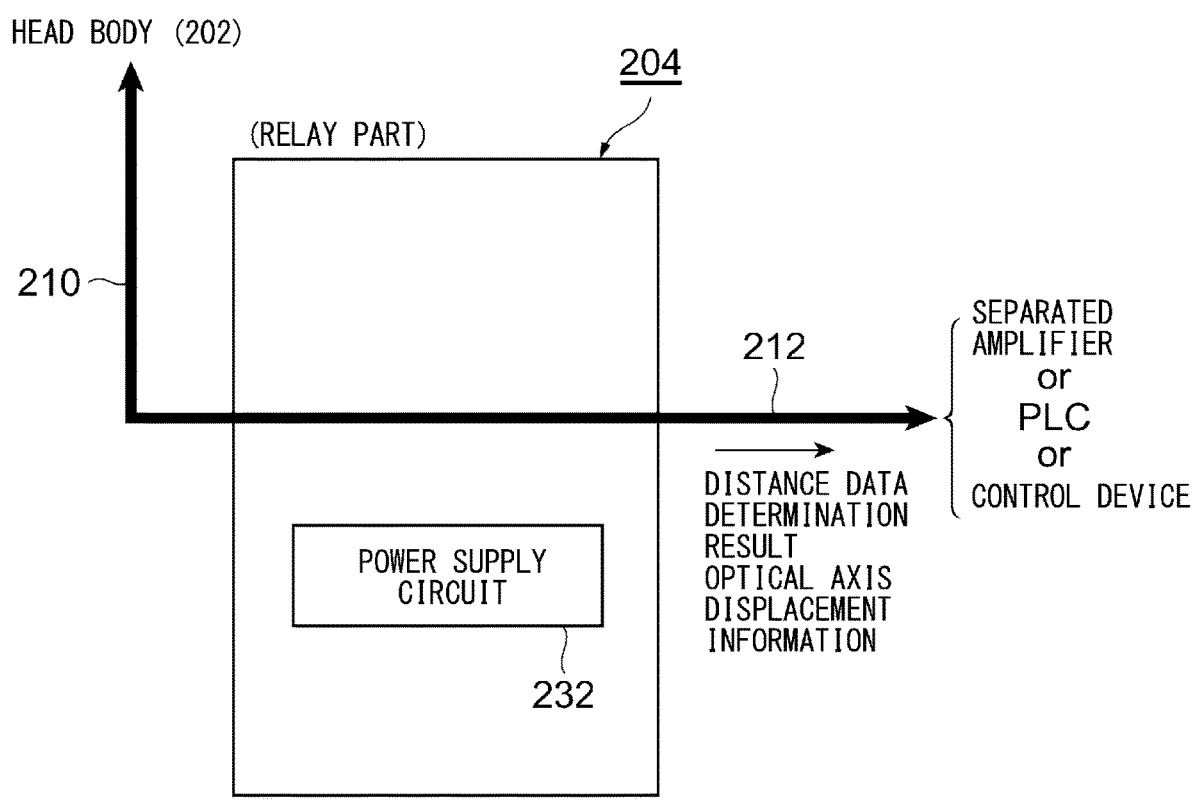
FIG. 31 is a block diagram of the relay part included in the second embodiment, in which a power supply circuit extracted from the head body is provided in the relay part.

With reference to FIG. 31, the triangulation sensor 200 according to the second embodiment can supply the distance data, the ON/OFF determination result, and the optical axis displacement information generated by the head body 202 to the separated amplifier 300, the PLC, and the control device through the external connection cable 212. That is, the triangulation sensor 200 can be used as a displacement sensor without a display function.

Although the preferred embodiments of the present invention have been described above, the present invention is not limited to a laser displacement sensor that projects laser light. The present invention is not limited by a type of light source and is applicable to a triangulation type and a time of flight (TOF) type. The present invention is also applicable to a light-receiving photoelectric sensor.

What is claimed is:

1. An optical displacement sensor comprising:
a first housing including a transmission window that transmits light;
a light projector that is provided in the first housing and projects measurement light toward a detection region through the transmission window;
a light receiver that is provided in the first housing and performs photoelectric conversion on the measurement light from the detection region through the transmission window to generate a light receiving signal;
a processor that is provided in the first housing and measures displacement of a to-be-detected object on the basis of the light receiving signal generated by the light receiver;
a second housing that has a waterproof structure and an elongated outer shape having a first end and a second end along a longitudinal direction, and four side surfaces around a first axis along the longitudinal direction, and includes at least a first power supply circuit that supplies power and the second housing further includes a receiving circuit that receives measurement information generated by the processor in the first housing;
a display disposed on a first surface of the four side surfaces, configured to display numerical information of the displacement on the basis of the measurement information received by the receiving circuit;
an operation user interface disposed on a second surface of the four side surfaces, for use in setting a determination threshold, the second surface adjacent to the first surface around the first axis; and
a cable that connects between the first housing and the second housing, and transmits power to the light projector, the light receiver, and the processor in the first housing,
wherein one end of the cable is disposed in the first housing and the other end of the cable is disposed in the second housing through the first end, and
the display further displays the determination threshold set on the basis of an operation instruction via the operation user interface.

2. The optical displacement sensor according to claim 1, wherein
the waterproof structure includes a gasket disposed around an end of the cable and a cap that deforms the gasket by compression.

3. The optical displacement sensor according to claim 1, wherein a raised portion is provided on the second surface to prevent misoperation of the operation user interface.

4. The optical displacement sensor according to claim 1, wherein
the second housing is integrally connected to the first housing by the cable.

5. The optical displacement sensor according to claim 1, wherein
the first housing is provided with a first operation indicator lamp showing a comparison result generated by comparing the displacement of the to-be-detected object measured by the processor with a determination threshold, and
the second housing is provided with a second operation indicator lamp that lights up or blinks in synchronization with and in the same color as the first operation indicator lamp.

6. The optical displacement sensor according to claim 1, further comprising an output cable non-detachably connected at the second end of the second housing.

7. The optical displacement sensor according to claim 1, wherein
the second housing has a rectangular cross section orthogonal to the longitudinal direction, and the first surface and the second surface are coupled at right angles.

8. The optical displacement sensor according to claim 1, wherein the cable non-detachably connects between the first housing and the second housing without connectors.

9. The optical displacement sensor according to claim 8, further comprising an output connector disposed at the second end of the second housing, configured to connect an output cable.

10. The optical displacement sensor according to claim 1, wherein
the display displays the determination threshold set on the basis of an operation instruction of the operation user interface and the measurement information based on the displacement measured by the processor.

11. The optical displacement sensor according to claim 10, wherein
the waterproof structure includes a gasket disposed around an end of the cable and a cap that deforms the gasket by compression.

12. The optical displacement sensor according to claim 1, wherein
the light projector in the first housing includes a green semiconductor laser that emits green laser light as the measurement light, and
the first power supply circuit in the second housing supplies power for driving the green semiconductor laser.

13. The optical displacement sensor according to claim 12, wherein
the green semiconductor laser includes gallium nitride, and the green laser light has a wavelength of 500 nm to 555 nm.

14. The optical displacement sensor according to claim 13, further comprising, in the first housing, a limiter that limits intensity and power of the green laser light in accordance with a safety standard "Class 1" or "Class 2".

15. The optical displacement sensor according to claim 1, wherein the first housing includes a second power supply circuit that steps down a voltage received from the first power supply circuit.

16. The optical displacement sensor according to claim 15, wherein
the light projector in the first housing includes a green semiconductor laser that emits green laser light as the measurement light, and
the first power supply circuit in the second housing supplies power for driving the green semiconductor laser.

17. The optical displacement sensor according to claim 16, wherein the green semiconductor laser includes InGaN/GaN, and
the measurement light has a wavelength of 500 nm to 555 nm.

18. The optical displacement sensor according to claim 16, further comprising, in the first housing, a limiter that limits intensity and power of the green laser light in accordance with a safety standard "Class 1" or "Class 2".

* * * * *